(12) United States Patent
Koike et al.

(10) Patent No.: US 11,745,954 B2
(45) Date of Patent: Sep. 5, 2023

(54) ROTOR FOR TABLET CASSETTE AND TABLET CASSETTE

(71) Applicant: YUYAMA MFG. CO., LTD., Osaka (JP)

(72) Inventors: Naoki Koike, Osaka (JP); Akira Maeda, Osaka (JP)

(73) Assignee: YUYAMA MFG. CO., LTD., Osaka (JP)

( * ) Notice: Subject to any disclaimer, the term of this patent is extended or adjusted under 35 U.S.C. 154(b) by 206 days.

(21) Appl. No.: 17/296,707

(22) PCT Filed: Dec. 10, 2019

(86) PCT No.: PCT/JP2019/048338
§ 371 (c)(1),
(2) Date: May 25, 2021

(87) PCT Pub. No.: WO2020/122074
PCT Pub. Date: Jun. 18, 2020

(65) Prior Publication Data
US 2022/0024698 A1    Jan. 27, 2022

(30) Foreign Application Priority Data

Dec. 13, 2018   (JP) ................. 2018-233931

(51) Int. Cl.
*B65G 47/14*     (2006.01)
*A61J 7/00*      (2006.01)
*B65G 65/48*     (2006.01)

(52) U.S. Cl.
CPC .......... *B65G 47/14* (2013.01); *A61J 7/0076* (2013.01); *B65G 65/4809* (2013.01); *B65G 2201/027* (2013.01)

(58) Field of Classification Search
CPC ... A61J 3/00; A61J 7/0076; A61J 1/03; B65D 83/0409; B65D 1/30; B65B 1/30; B65G 2201/027
(Continued)

(56) References Cited

U.S. PATENT DOCUMENTS 3,741,703 A * 6/1973 Reynolds .................. B29B 9/00
                                              425/222
4,588,366 A * 5/1986 Glatt ........................ B01J 2/16
                                              264/117
(Continued)

FOREIGN PATENT DOCUMENTS

CN      108472199 A  *  8/2018  ................ A61J 3/00
EP      1285850 A2  *  2/2003  ............. B65B 35/08
(Continued)

OTHER PUBLICATIONS

Taiwan Intellectual Property Office, Office Action dated Dec. 7, 2022 for Taiwanese patent application No. 108145559, 3 pages.
(Continued)

*Primary Examiner* — Rakesh Kumar
(74) *Attorney, Agent, or Firm* — MASUVALLEY & PARTNERS; Peter R. Martinez

(57) ABSTRACT

A rotor (4) is received rotatably in a cassette body (3) for receiving tablets. The rotor comprises a tablet guiding path (4b) formed between a slanted inner face (6a) of the cassette body and a slanted outer face (22a) of the rotor for guiding the tablets received in the cassette body to a tablet discharging hole (7) disposed to the cassette body. The rotor comprises a separating member (8) disposed above the tablet discharging hole of the cassette body for separating a space between a tablet at a bottom position and a tablet at an upper position, a tablet supporting pedestal (53) disposed elevatably to the tablet guiding path for supporting the tablet at the bottom position in the tablet guiding path and a height (Continued)

adjustment mechanism (50) for adjusting a tablet discharging height between the tablet supporting pedestal and the separating member. The height adjustment mechanism makes the tablet supporting pedestal elevate to a direction inclined to a rotation shaft of the rotor along the tablet guiding path.

8 Claims, 17 Drawing Sheets

(58) Field of Classification Search
USPC .......................................... 221/187, 204, 1
See application file for complete search history.

(56) References Cited

U.S. PATENT DOCUMENTS

| | | | | | |
|---|---|---|---|---|---|
| 4,946,359 | A | * | 8/1990 | Christen | B01J 2/10 |
| | | | | | 425/222 |
| 5,026,709 | A | * | 6/1991 | Harwood | A61J 3/005 |
| | | | | | 514/263.34 |
| 5,803,309 | A | * | 9/1998 | Yuyama | G07F 11/44 |
| | | | | | 221/27 |
| 6,073,799 | A | * | 6/2000 | Yuyama | G07F 17/0092 |
| | | | | | 221/258 |
| 6,786,356 | B2 | * | 9/2004 | Geiger | A47J 31/60 |
| | | | | | 99/290 |
| 8,430,269 | B2 | * | 4/2013 | Nam | B65B 35/08 |
| | | | | | 221/265 |
| 9,238,545 | B2 | * | 1/2016 | Bae | G07F 11/44 |
| 11,382,834 | B2 | * | 7/2022 | Risch | A61J 7/0076 |
| 2006/0213917 | A1 | * | 9/2006 | Handfield | G06V 20/66 |
| | | | | | 221/9 |
| 2011/0163112 | A1 | * | 7/2011 | Takahama | G07F 17/0092 |
| | | | | | 221/277 |
| 2013/0256097 | A1 | * | 10/2013 | Koike | B65G 47/1428 |
| | | | | | 198/803.16 |
| 2013/0284755 | A1 | * | 10/2013 | Yuyama | B65B 59/001 |
| | | | | | 221/277 |
| 2016/0371916 | A1 | * | 12/2016 | Omura | G07F 17/0092 |
| 2018/0161247 | A1 | | 6/2018 | Koike et al. | |

FOREIGN PATENT DOCUMENTS

| | | | | | |
|---|---|---|---|---|---|
| EP | 3235737 | A1 | * | 10/2017 | ................ A61J 3/07 |
| EP | 3756639 | A1 | * | 12/2020 | ................ A61J 1/03 |
| EP | 4104809 | A1 | * | 12/2022 | ............ A61J 7/0076 |
| JP | 08164904 | A | * | 6/1996 | ............ B65B 35/08 |
| JP | 2000203502 | A | * | 7/2000 | ............ B65B 35/08 |
| JP | 6222414 | B1 | | 10/2017 | |
| JP | 2021137151 | A | * | 9/2021 | ............ B65B 35/08 |
| JP | 2021142014 | A | * | 9/2021 | ............ B65B 35/08 |
| WO | WO-2012096328 | A1 | * | 7/2012 | ............ A61J 7/0076 |
| WO | WO-2016099094 | A1 | * | 6/2016 | ................ A61J 3/07 |
| WO | 2015/002259 | A1 | | 12/2016 | |
| WO | WO 2017/164196 | A1 | | 9/2017 | |
| WO | WO-2017164196 | A1 | * | 9/2017 | ................ A61J 3/00 |
| WO | WO-2020122074 | A1 | * | 6/2020 | ................ A61J 3/00 |
| WO | WO-2020170664 | A1 | * | 8/2020 | ................ A61J 1/03 |
| WO | WO-2021177428 | A1 | * | 9/2021 | ............ B65B 35/08 |

OTHER PUBLICATIONS

WIPO, Japanese International Search Authority, International Search Report (with English translation) and Written Opinion dated Jan. 21, 2020 in International Patent Application No. PCT/JP2019/048338, 9 pages.

* cited by examiner (a)

(b)

(a)

(b)

(a)

(b)

(a)

(b)

(a)

(b)

(c)

ROTOR FOR TABLET CASSETTE AND TABLET CASSETTE

FIELD OF INVENTION

The present invention relates to a rotor and a tablet cassette utilizing the rotor and the tablet cassette being disposed to a tablet storage/dispensation apparatus that stores a plurality of tablets and dispenses the tablets by required number according to a prescription.

BACKGROUND ART

A tablet storage/dispensation apparatus placed at ethical pharmacies and hospitals can provide automatically tablets depending on prescriptions to many patients quickly, certainly, and safely. For tablets, though there are many shapes and sizes such as a circular shape, an elliptic shape, a capsule shape, a sugar-coated tablet shape, and the like, the tablet storage/dispensation apparatus is desired to enable dispensation of tablets in many kinds as much as possible.

The tablet storage/dispensation apparatus has many tablet cassettes being capable of storing and dispensing tablets in different kinds. Each of the tablet cassettes is equipped with a cassette body storing tablets and a rotor disposed rotatably and drivably at the bottom of a cassette body. When the rotor rotates, the tablets in the cassette body are guided in turn to a plurality of tablet guiding paths formed to the rotor, and at the time when each of the tablet guiding paths is aligned to a tablet discharging hole, the tablet at the bottom in the tablet guiding path is separated from the just upper tablet by a separating member such that only the bottom tablet is discharged from the tablet discharging hole.

The applicant has proposed in Patent Literature 1, depending on sizes, shapes, kinds of tablets, the rotor of the tablet cassette that is able to change a width and a depth of the tablet guiding path and a height from a tablet supporting pedestal disposed at the bottom of the tablet guiding path to the separating member. As shown in FIG. 23, a face at the rotor side along the depth direction of the tablet guiding path 201 formed to the rotor 200 of Patent Literature 1 is defined by a slanted outer face 202a of an elevatable rotor body 202 and is inclined to a rotation shaft of the rotor 200 while opposing to a slanted inner face 203a having a reversed-cone shape of the cassette body 203. Furthermore, the tablet supporting pedestal 204 is disposed at the top of the arm 207 formed to the elevatable member 206 which is screwed to the outer-peripheral screw part of cylindrical rotation part 205.

As shown in FIGS. 23 (a), (b), and (c), when the rotor body 202 is moved elevatably along the rotation shaft direction of the rotor 200, a distance between the slanted inner face 203 of the cassette body 203 and the slanted outer face 202a of the rotor body 202 changes so that the depth of the tablet guiding path 201 may be adjusted depending on the thickness of tablets. Furthermore, when a rotation member 205 is made to rotate, an elevatable member 206 goes up and down and according to this, the tablet supporting pedestal 204 moves toward the rotation shaft of rotor 200 such that a distance between the tablet supporting pedestal 204 and the separating member 208 may be adjusted depending on the height of tablets.

Although the cassette body 203 facing opposite to the slanted outer face 202a of the rotor body 202 is the slanted inner face 203a, the bottom part of the cassette body 203 is formed to a cylindrical face 203b for allowing the arm of the elevatable member 206 to elevate along the rotation shaft of rotor 200. Thus, as shown FIG. 23 (c), when the arm of the elevatable member 206 is positioned at the lowest position, a space S between an upper face of the tablet supporting pedestal 204 and the cylindrical face 203b of the cassette body 203 becomes increased. When the bottom tablet in the tablet guiding path 201 enters to the increased space S, the top part of the tablet becomes mismatch with the position of the separating member 208 and the second tablet clogs by interfering with the separating member 208 to disturb the rotation of the rotor 200.

PRIOR ART LITERATURE

Patent Literature

Patent Literature 1: Japanese Patent No. 6222414

SUMMARY OF INVENTION

Problem to be Solved by Invention

The present invention has been completed considering the above conventional problem and the present invention aims to provide a rotor for a cassette and a tablet cassette which are able to prevent tablets from clogging in the tablet guiding path regardless of the elevation position of the tablet supporting pedestal.

Means for Solving Problem

As means for solving the above problem, the present invention is configured such that a rotor received rotatably in a cassette body for receiving tablets comprises a tablet guiding path formed between a slanted inner face of the cassette body and a slanted outer face of the rotor for guiding the tablets received in the cassette body to a tablet discharging hole disposed to the cassette body, a separating member disposed above the tablet discharging hole of the cassette body for separating a space between a tablet at a bottom position and a tablet at an upper position, a tablet supporting pedestal disposed elevatably to the tablet guiding path for supporting the tablet at the bottom position in the tablet guiding path, and a height adjustment mechanism for adjusting a tablet discharging height between the tablet supporting pedestal and the separating member, and the height adjustment mechanism makes the tablet supporting pedestal elevate to a direction inclined to a rotation shaft of the rotor along the tablet guiding path.

In the present invention, even if the tablet supporting pedestal goes up to the direction inclined to the rotation shaft of tablet supporting pedestal along the tablet guiding path, the space between the upper face of tablet supporting pedestal and the inner face of cassette body does not increase. Thus, the tablet can be prevented from clogging in the tablet guiding path independent of the elevation position of tablet supporting pedestal.

The height adjustment mechanism preferably comprises a rotatable rotation member formed with a spiral guide at an outer circumferential face for engaging with the tablet supporting pedestal, a supporting member for preventing movement of the tablet supporting pedestal along the spiral guide by supporting the tablet supporting pedestal from both sides, and a height adjustment member for making the tablet supporting pedestal engaging with the spiral guide elevate to a direction inclined to a rotation shaft of the rotor.

The rotation member preferably includes a reversed cone-shaped outer circumferential face.

The supporting member preferably comprises a reversed cone-shape covering an outer side of the rotation member and is formed with a slit for allowing the tablet supporting pedestal to protrude and the slit extends along the tablet guiding path to support the tablet supporting pedestal from both sides.

The height adjustment member preferably comprises a driving gear meshing with a driven gear formed at an inner circumferential face of the rotation member and is externally operatable.

The rotor preferably comprises a lower base, an operation base, and an upper base, and the supporting member is fixed to the lower base, the operation base is fixed to the supporting base, and the upper base is fixed to the operation base.

The height adjustment mechanism preferably comprises a first rotation member, a plurality of second rotation members synchronously rotating with the first rotation member and being formed with a male screw to which the tablet supporting pedestal is screwed, a supporting member for preventing the tablet supporting pedestal from rotating about the second rotation member by supporting the tablet supporting pedestal from both sides, a height adjustment member for making the first rotation member rotate and making the second rotation shaft member rotate through the first rotation member so as to make the tablet supporting pedestal elevate to a direction inclined to a rotation shaft of the rotor.

As for another means for solving the problem, the present invention is configured such that a rotor received rotatably in a cassette body for receiving tablets comprises a tablet guiding path formed between a slanted inner face of the cassette body and a slanted outer face of the rotor for guiding the tablets received in the cassette body to a tablet discharging hole disposed to the cassette body, a separating member disposed above the tablet discharging hole of the cassette body for separating a space between a tablet at a bottom position and a tablet at an upper position, a tablet supporting pedestal disposed elevatably to the tablet guiding path for supporting the tablet at the bottom position in the tablet guiding path, and a height adjustment mechanism for adjusting a tablet discharging height between the tablet supporting pedestal and the separating member, and the height adjustment mechanism makes the tablet supporting pedestal elevate with keeping a protrusion amount from the slanted outer face constant independent of an elevation position of the tablet supporting pedestal.

Advantageous Effect of Invention

According to the present invention, even though a tablet supporting pedestal goes upward to an inclined direction to a rotation shaft of a rotor along a tablet guiding path, a space between an upper face of the tablet supporting pedestal and an inner face of the cassette body does not increase so that clogging of tablets within the tablet guiding path may be prevented.

MODE FOR PRACTICING INVENTION

Now, embodiments of the present invention will be explained according to drawings attached.

Figure 1:
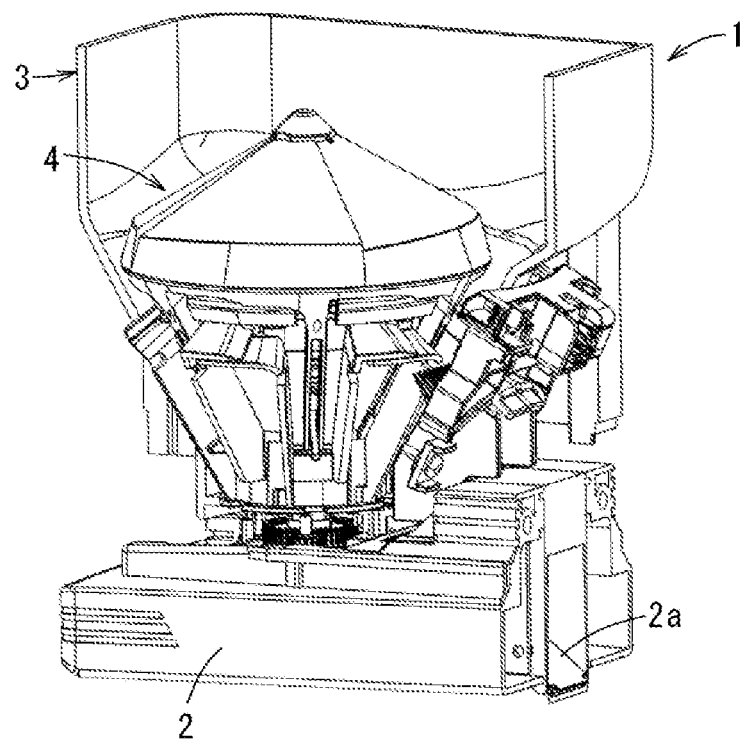
FIG. 1 A partial cross-sectional perspective view of a tablet cassette and a motor base including a rotor of the present invention.

FIG. 1 shows a tablet cassette 1 equipped to a tablet storage/dispensation apparatus. The tablet cassette 1 includes a cassette body 3 disposed on a motor base 2 and a rotor 4 of the present invention received in the cassette body 3.

Figure 2:
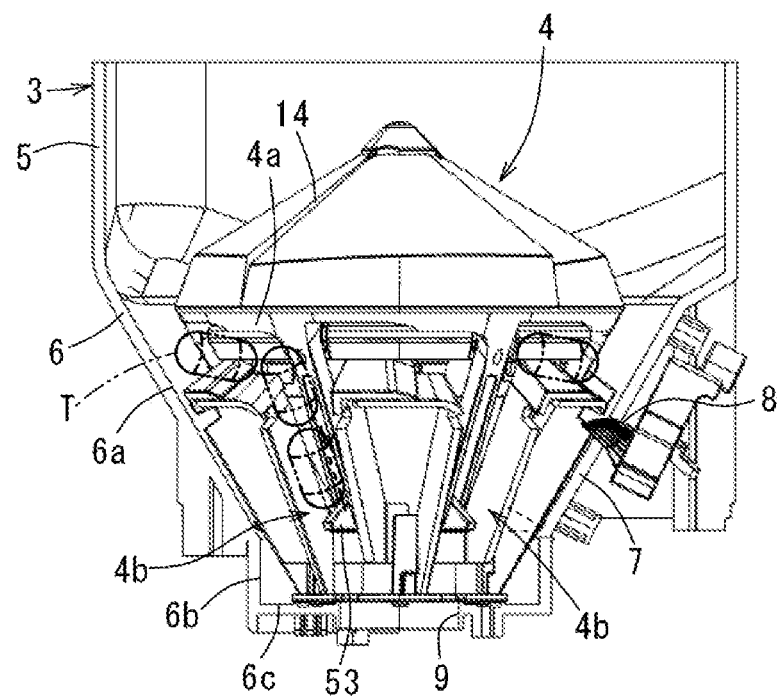
FIG. 2 A partial cross-sectional lateral view of a tablet cassette of FIG. 1.

The cassette body 3, as shown in FIG. 2, is configured from a tablet storage part 5 being capable of storing many tablets T and a rotor receiver part 6 disposed beneath the tablet storage part 5 for receiving the rotor 4. An upper end of the tablet storage part 5 is opened and is allowed to be opened and closed with a cover not illustrated. The rotor receiver part 6 includes an upper slanted inner face 6a having a revered-cone shape, a lower vertical inner face 6b having a cylindrical shape, and a bottom face 6c. At the bottom part of the upper slanted inner face 6a, a tablet discharging hole 7 is formed. The tablet discharging hole 7 is connected to a tablet discharge path 2a formed to the base 2. At an outer side of the cassette body 3, a separating member 8 is disposed and a top of a separating member 8 is inserted into the inside from the outside of the rotor receiver part 6 through the upper part of the tablet discharging hole 7. At the center of the bottom face 6c, a rotor shaft hole 9 is formed.

Figure 3:
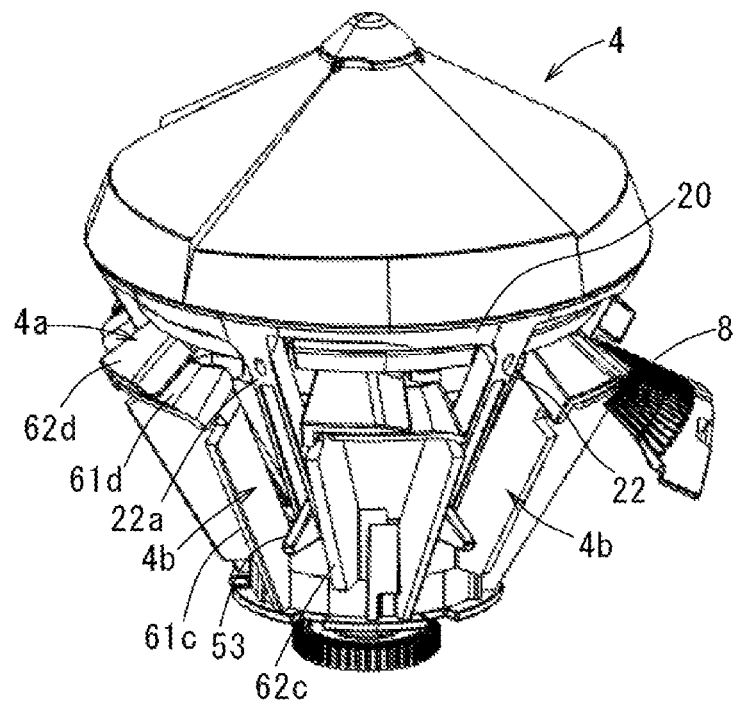
FIG. 3 A perspective view looked down from a top of a rotor (a) and a perspective view looked up from a bottom (b).
Figure 3:
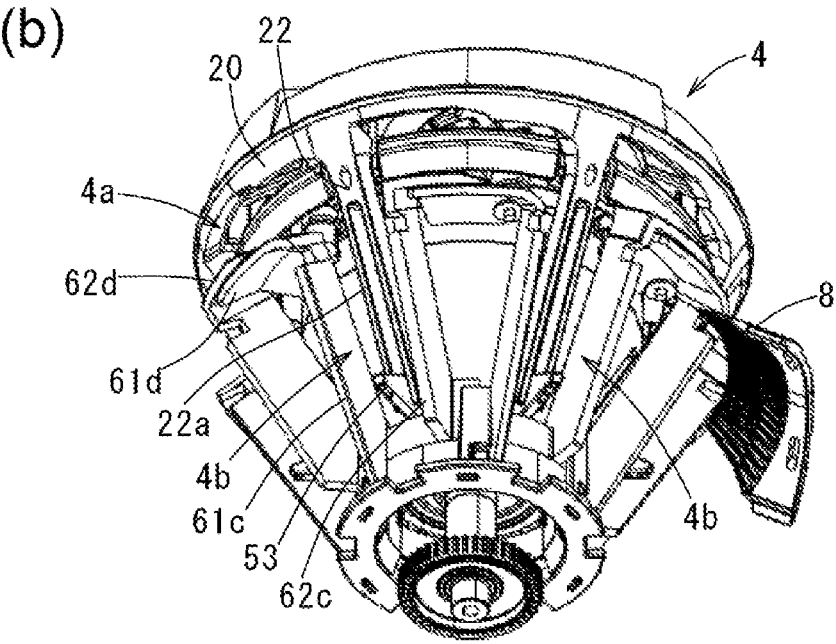

The rotor 4, as shown in FIG. 3, has a shape having a cone-shaped upper face, a reversed-cone shaped lateral face, and a plane bottom face. At the upper lateral part of the rotor, and between the upper slanted inner face 6a of the cassette 3, a tablet pocket 4a extending circumferentially is disposed, and a plurality of tablet guiding paths 4b (in the embodiment six) extending downwardly from the tablet pocket 4a are disposed circumferentially in even spacings.

The tablet pocket 4a is formed by an outer peripheral face of the elevator member 20, a first horizontal protrusion piece 61d of the first movable member 61, and a horizontal protrusion piece 62f of a second movable member 62 each of which will be explained later, and the tablet pocket 4a is enclosed by the upper slanted inner face 6a of the cassette body 3 to receive and to align the tablet T of the tablet storage part 5.

The tablet guiding path 4b is formed between the upper slanted inner face 6a of the cassette body 3 and the slanted outer face 22a of the downward protrusion part 22 formed to the elevator member 20 which will be explained later. Furthermore, the tablet guiding path 4b includes a first vertical protrusion piece 61c of a first movable member 61 described later, a second vertical protrusion piece 62c of a second movable member 62 described later, and a tablet supporting pedestal 53 described later to receive and to guide the tablet T aligned in the tablet pocket 4a.

Figure 4:
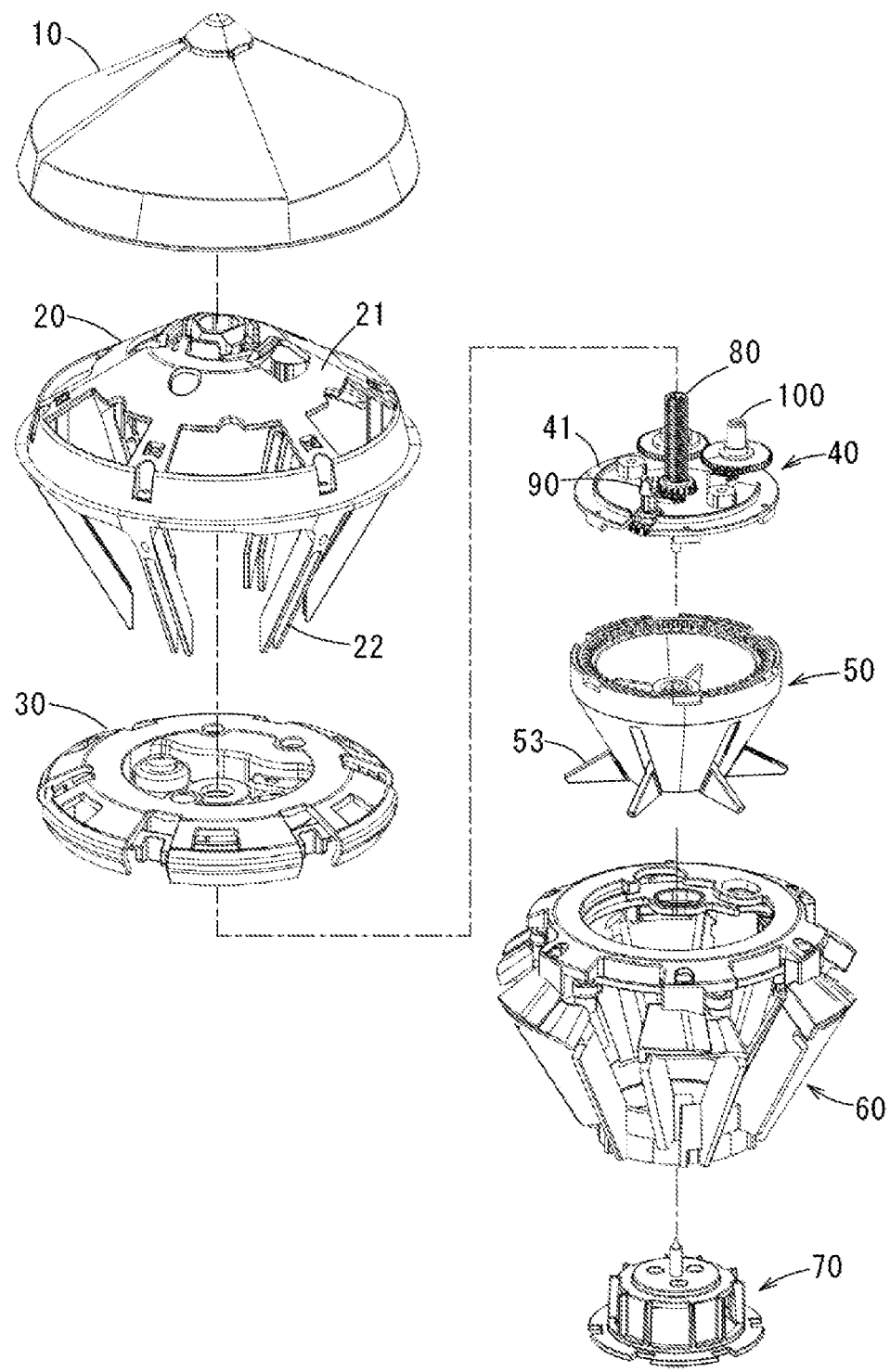
FIG. 4 An exploded perspective view of a rotor.

FIG. 4 shows a rotor 4 in an exploded state. The rotor 4 includes a rotor cover 10, an elevator member 20, an upper base 30, an operation part 40, a height adjustment part 50, a width adjustment part 60, and a lower base 70, thereby, as described hereunder, a depth adjustment mechanism, a height adjustment mechanism and a width adjustment mechanism are configured such that depending on the thickness, the height, and the width of the tablet received in the tablet receiver part 5, the depth, the height, and the width of the tablet guiding path 4b may be adjusted.

<Depth Adjustment Mechanism>

Figure 5:
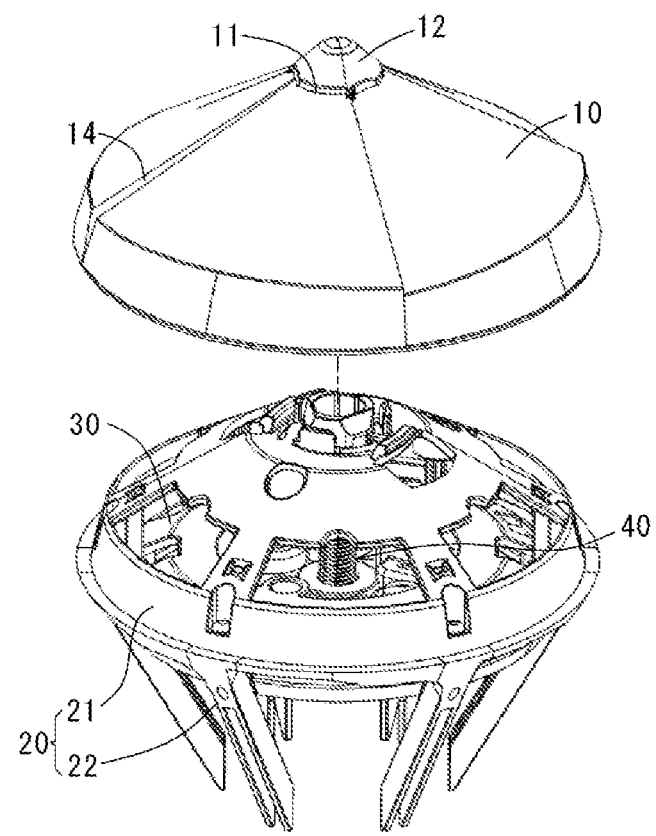
FIG. 5 A whole perspective view of a depth adjustment mechanism.
Figure 6:
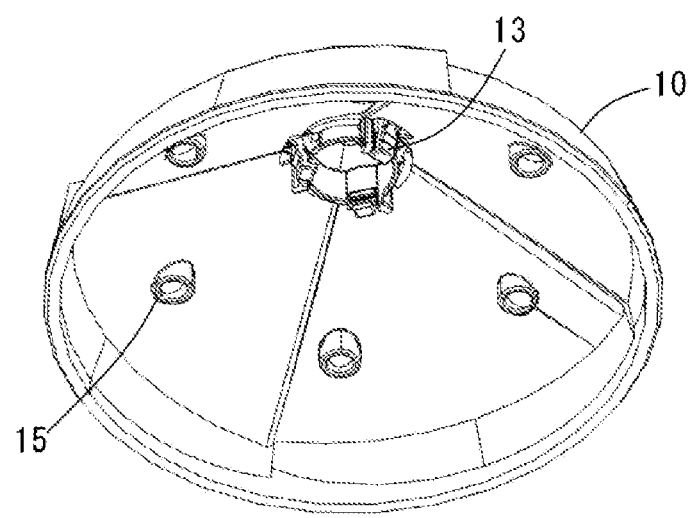
FIG. 6 A perspective view of a cover looked up from a bottom.
Figure 7:
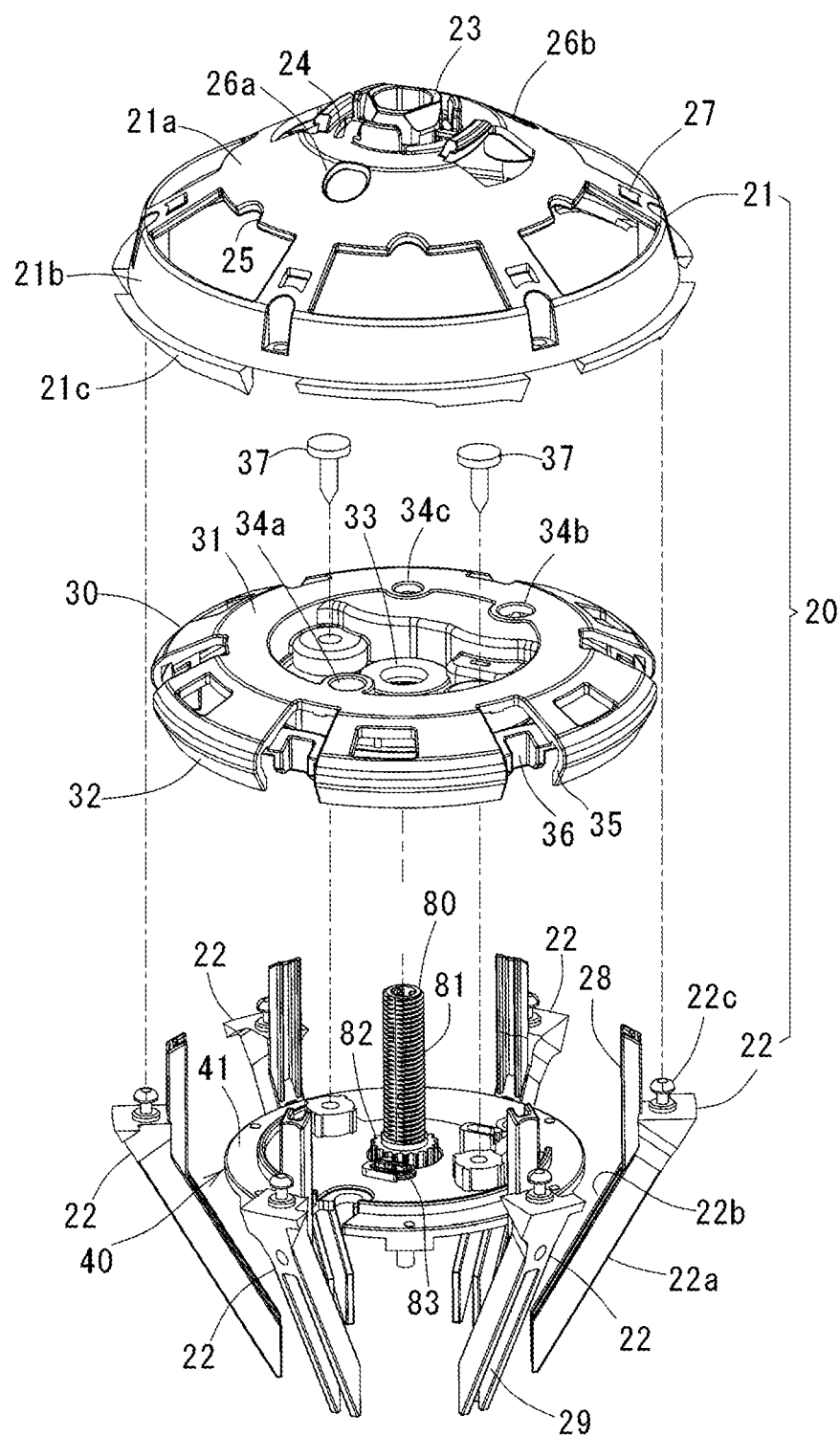
FIG. 7 An exploded perspective view of a base part of an elevator member.

FIG. 5 shows a whole view of a depth adjustment mechanism, and FIG. 6 and FIG. 7 show members configuring the depth adjustment mechanism. The depth adjustment mechanism is configured from a rotor cover 10, an elevator member 20, an upper base 30, and a depth adjustment member 80 of the operation part 40.

The rotor cover 10 has, as shown in FIG. 5 and FIG. 6, generally an umbrella shape. The upper face of the rotor cover 10 is formed as a cone shape and its outer peripheral face is formed as a cone shape having more acute inclination than that of the upper face. To a cap attachment hole 11 disposed at the center of the upper face of the rotor cover, a cap 12 is detachably attached. To the inner face of the rotor cover 10, an engagement piece 13 is disposed at the edge of the cap attachment hole 11 such that the engagement piece 13 can engage with the engagement hole 24 of the elevator member 20 shown in FIG. 7 to make the rotor cover 10 detachable to the elevator member 20. To the upper face of the rotor cover 10, a plurality of steps 14 is formed circumferentially, and by these steps 14, the tablets stored in the cassette body 3 with respect to the rotation of rotor 4 can be mixed. To the inner face of the rotor cover 10, protrusions 15 are formed at six evenly distributed positions, and the protrusions 15 engage with the notches 25 of the elevator member 20 shown in FIG. 7 such that the rotor cover 10 does not rotate relatively to the elevator member 20.

The elevator member 20 includes as shown in FIG. 7 a base part 21 and protrusion parts 22 extending downward.

Figure 8:
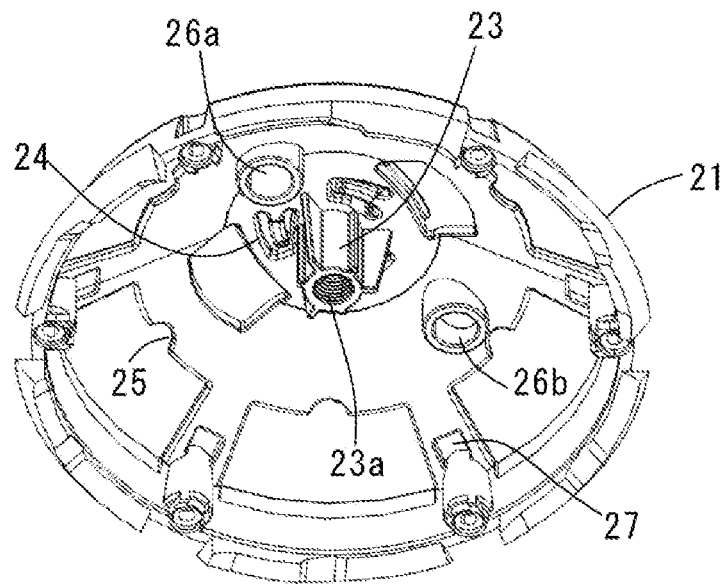
FIG. 8 A perspective view below a base part of an elevator member.

A base 21 includes, as shown in FIG. 7 and FIG. 8, for making it possible to enshroud the rotor cover 10, a cone-shaped upper face 21a, an outer peripheral face 21b having a cone shape with more acute inclination than that of the upper face 21a, an outer peripheral edge 21c extending downward from six evenly distributed positions at the bottom end of the outer peripheral face 21b. To the base 21, a shaft part 23 protruding up-and-down is disposed at the center thereof, and a screw hole 23a is formed within which the male screw part 81 of a depth adjustment member 80 described later is screwed. To the upper face 21a of the base part 21, an engagement hole 24 with which the engagement piece 13 of the rotor cover 10 engages, notches 25 with which the protrusions of rotor cover 10 engage, two holes 26a, 26b from which the height adjustment member 90 and the width adjustment member 100 described later are exposed, and six supporting holes 27 for supporting the upper end of the slide part 28 of the downward extending protrusion parts 22 are formed.

The downward extending protrusion part 22 is, as shown in FIG. 7, fixed by a fixing screw 22c between adjacent outer peripheral edges of the base part 21. The downward extending protrusion part 22 extends inward and downward and includes a slanted outer face 22a and a slanted inner face 22b. The slanted outer face 22a of the downward extending protrusion part 22 forms a continuous face to the outer peripheral edge 21c of the base part 21 and forms a bottom face of the tablet guiding path 4b. At the upper part of the slanted inner face 22b, a slide part 28 is disposed. An upper end of the slide part 28 is supported by a supporting hole 27 of the base 21. At a lower end of the downward extending protrusion part 22, a slit 29 is formed for allowing the tablet supporting pedestal 53 to protrude from the inside.

The elevator member 20, as shown in FIG. 7, by engaging the slide part 28 with the guide member 36 of the upper base, rotates elevatably to an upper base 30 and integrally with the upper base 30.

Figure 9:
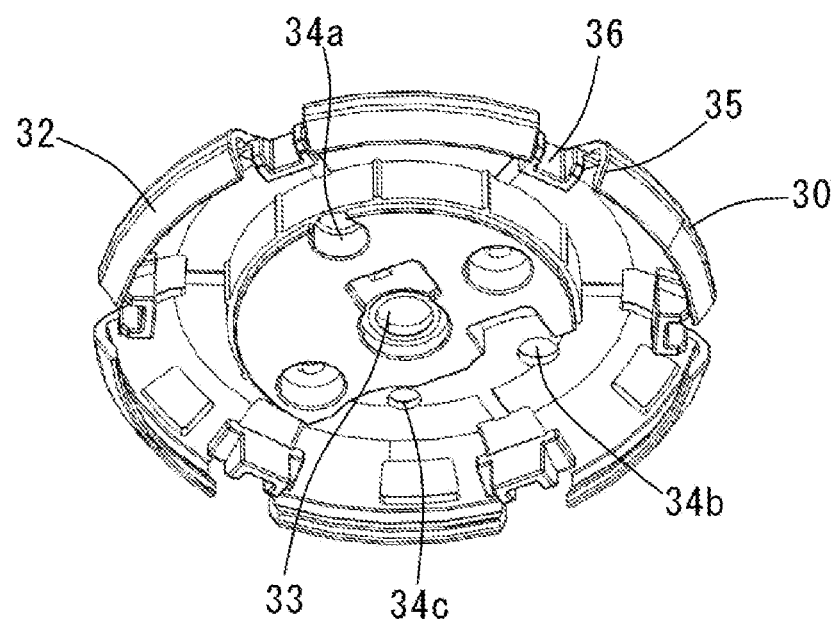
FIG. 9 A perspective view of an upper base looked up from a bottom.

The upper base 30 includes, as shown in FIG. 7 and FIG. 9, a circular base part 31 and an outer peripheral edge 32. At a base part 31 of the upper base 30, a hole 33 into which a depth adjustment member 80 described later is inserted, a hole 34a through which a height adjustment member 90 described later passes, and holes 34b, 34c through which a width adjustment member 100 pass. A notch parts 35 are formed at circumferential six evenly distributed positions of the outer peripheral edge of the upper base 30 and to the notch parts 35, guide parts 36 each having a U-shaped cross section are formed for guiding the slide part 28 of the downward extending protrusion part 22. The upper base 30 is fixed to an operation base 41 of an operation part 40 by a fixing screw 37.

The operation part 40 is, as shown in FIG. 4, one that the depth adjustment part 80, the height adjustment part 90, and the width adjustment part 100 are assembled.

Figure 10:
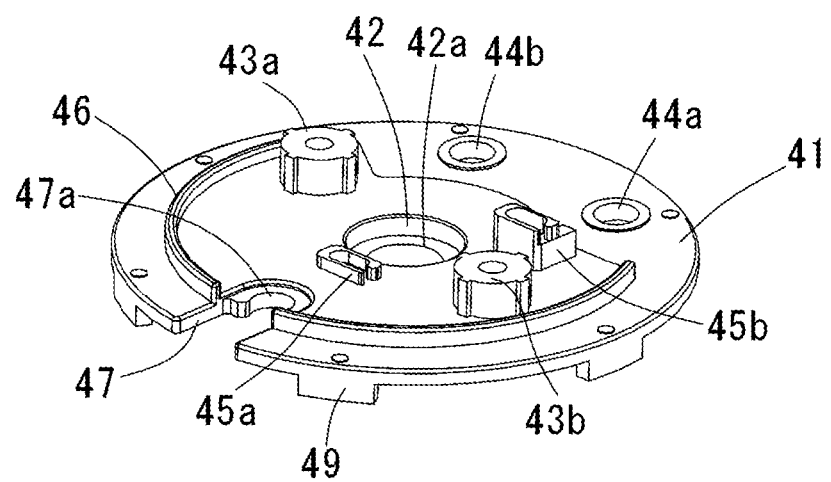
FIG. 10 A perspective view looked down from a top of an operation base (a) and a perspective view looked up from a bottom.
Figure 10:
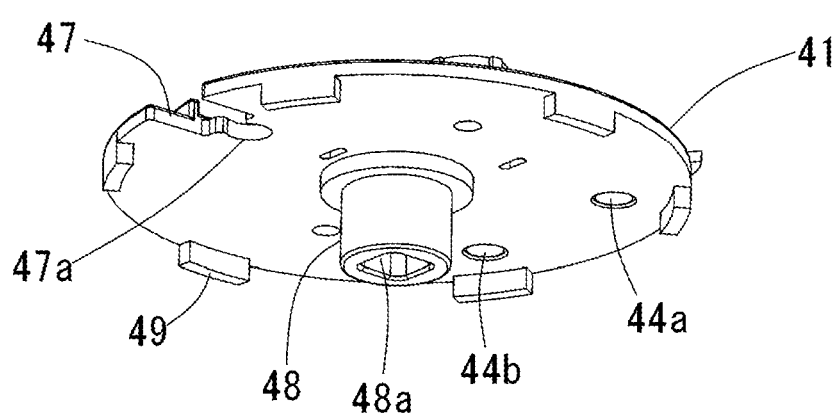

The operation base 41 has, as shown in FIG. 10, a circular shape and to the center of the upper face, a concave part 42 for supporting a lower end of the depth adjustment member 80 is formed and a screw passing-through hole 42a is formed at the center of a concave part 42. Furthermore, at the upper face of the operation base 41, attachment seats 43a, 43b for upper base 30, two holes 44 for supporting the width adjustment member 100, and stopper attachment seats 45a, 45b are formed. Furthermore, at an upper face of the operation base 41, a guide 46 having an arch shape with which an inner peripheral edge of a first supporting member 63 of the width adjustment part 60 engages. In addition, to an outer peripheral edge of the operation base 41, a notch 47 is formed and an engagement part 47a to which the depth adjustment member 80 engages is formed at an inner side of the notch 47. To the center of a back face of operation base 41, a columnar protrusion 48 is formed and at a lower end of the protrusion 48, a rectangular engagement hole 48a with which an engagement protrusion part 54a of a supporting shaft 54 of a supporting member 51 formed to the height adjustment part 50 engages. At an outer peripheral edge of the operation part 41, engagement pieces 49 are formed at circumferential six evenly distributed positions. The operation base 41 is attached integrally with the supporting member 51 by engaging the engagement piece 49 with an engagement concave part 51c of the supporting member 51 formed to the height adjustment part 50 shown in FIG. 12.

The depth adjustment member 80 of the operation part 40 includes, as shown in FIG. 7, a male screw part 81 and a gear part 82 at the lower end. The male screw part 81 screws into a screw hole 23 of the elevator member 20, and the gear part 82 at the lower end is received and supported in a concave part 42 of the operation base 41; the upper end of the male screw part 81 protrudes to expose from the screw hole 23a of the elevator member 20 for allowing adjustment by rotation from the outside. Between teeth of the gear part 82, a top of a stopper 83 formed of an elastic piece engages. The gear part 82 at the lower end of the depth adjustment member 80 is formed larger than the hole 23 of the upper base 30 such that the depth adjustment member 80 does not escape upward from the upper base 30.

<Height Adjustment Mechanism>

Figure 11:
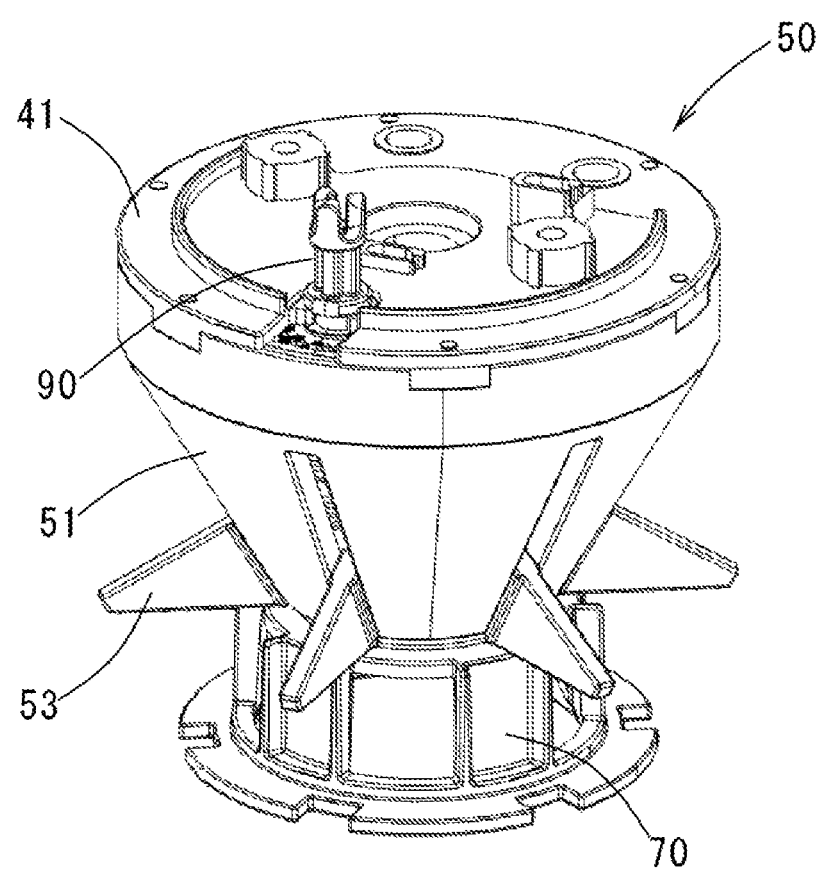
FIG. 11 A whole perspective view of a height adjustment mechanism.
Figure 12:
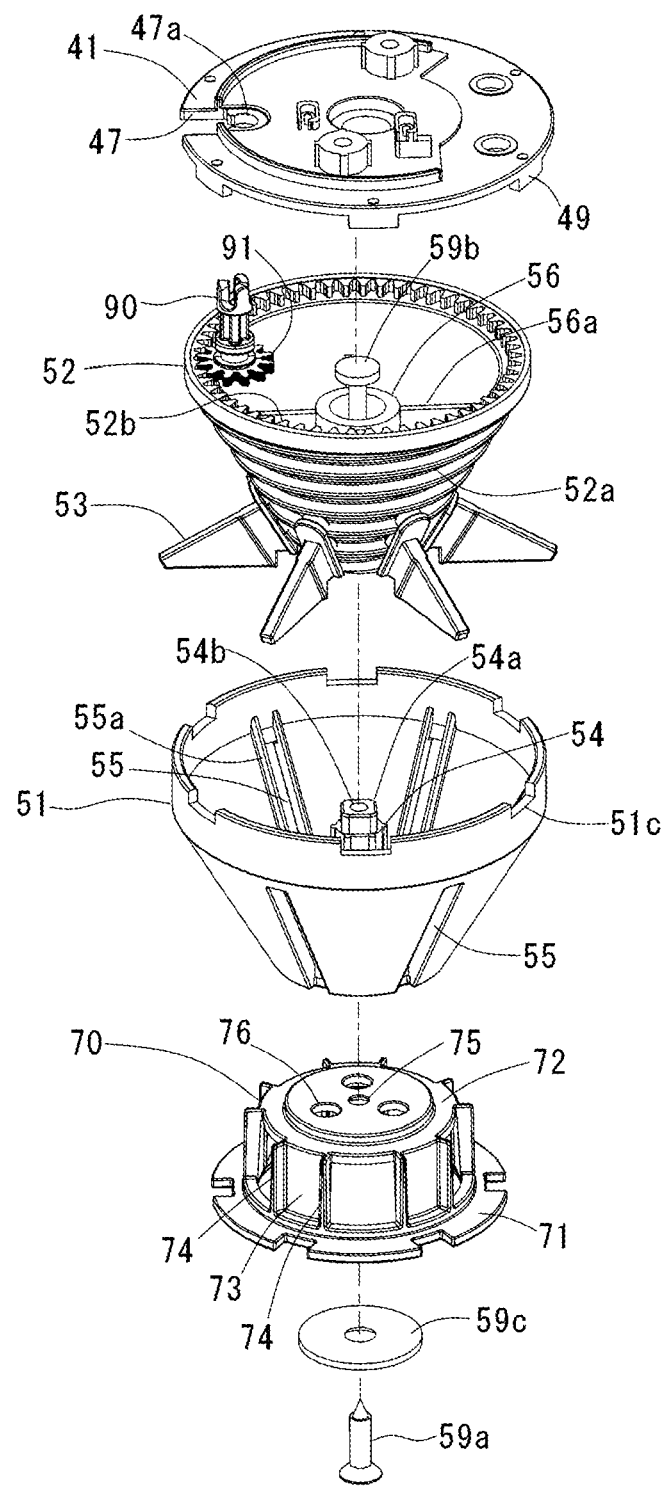
FIG. 12 An exploded perspective view looked down from a top showing configuration parts of a height adjustment mechanism.

FIG. 11 shows a whole view of a height adjustment mechanism and FIG. 12 shows members configuring the height adjustment mechanism. The height adjustment mechanism is configured by a lower base 70, a supporting member 51, a rotation member 52, and six tablet supporting pedestal 53, and a height adjustment member 90.

Figure 13:
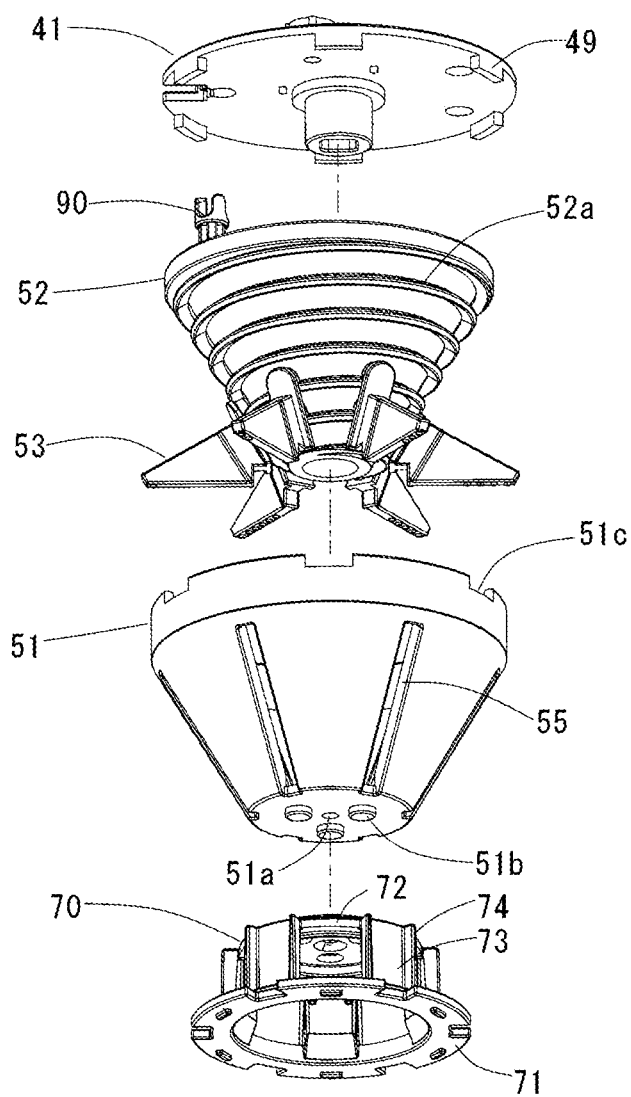
FIG. 13 An exploded perspective view looked up from a bottom showing configuration parts of a height adjustment mechanism.

The lower base 70 is configured as shown in FIGS. 12, 13 by an annular lower plate 71, a circular upper plate 72, five leg parts 73 disposed at circumferential five evenly distributed positions connecting the inner periphery of an inner circumferential edge of the lower plate 71 and the outer circumferential edge of the upper plate 72, and libs 74 disposed both lateral edges of each of the leg parts 73. At the center of the upper plate 72, a screw inserting hole 75 and three holes around the screw inserting hole 76 for engaging the convex parts 51b of the supporting member 51 are formed. To the inside of the lower base 70, a driving shaft not shown disposed at the bottom of the cassette body 3 engages.

The supporting member 51 has a shape of the container which has a reversed-cone shape and opens upward. At the center of a bottom face of the supporting member 51, a supporting shaft 54 for supporting rotatably a rotation member 52 is disposed protrudingly and upwardly. At the upper end of the supporting shaft 54, a quadrilateral engagement protrusion 54a with which an engagement part 48a of the operation base 41 engages and a screw hole 54b are formed. At the center of the bottom face and at the outer side of the supporting member 51, a screw hole 51a and three convex parts 51b about it are formed. To the outer circumferential face of the reversed-cone shape of the supporting member 51, slits 55 are formed radially at six circumferentially evenly distributed positions and guides 55a are defined inside both lateral edges of each slits 55. At the upper end of an outer circumferential edge of the supporting member 51 and at the six circumferentially evenly distributed positions, engagement concave parts 51c, with which the engagement pieces 49 of the operation base 41 formed to the operation base 40 engage are formed. The supporting member 51 is placed on the upper plate of the lower base 70, with making the convex parts 51b engage with the holes 76, and is fixed and attached to the lower base 70 by a fixing screw 59a through a magnet plate 59c.

The rotation member 52 has a cylinder shape which has a reversed-cone shape received with the supporting member 51 and opens upward and downward. To the inside of the rotation member 52, a cylinder-shaped shaft part 56 is supportingly disposed to the inner face of the rotation member 52 though the libs 56a. To the outer face of the rotation member 52, a spiral guide 52a having a spiral screw shape is formed. At the inner face and at the upper end of rotation member 52, a driven gear 52b is formed.

Figure 14:
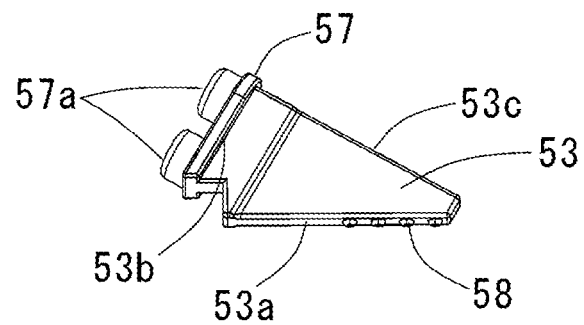
FIG. 14 A perspective view of a tablet supporting pedestal.

Each of the six tablet supporting pedestals 53 includes, as shown in FIG. 14, a bottom line 53a, a first hypotenuse 53b, and a second hypotenuse 53c, and has the plate shape of a near rigid angled triangle where the first hypotenuse 53b and the second hypotenuse 53c form the right angle. To the first hypotenuse 53b, a fixing base 57 is disposed, and to the fixing base 57, columnar two engagement protrusions 57a engaging with the recess of the spiral guide 52a are disposed. The second hypotenuse 53c is positioned at the lower part of the tablet guiding path 4b and supports the tablet at the bottom position in the tablet guiding path 4b. The second hypotenuse 53c is a face becoming a measure of the height between the tablet supporting pedestal 53 and the separating member 8 and all the second hypotenuses 53 of six tablet supporting pedestals 53 become the same height each other.

Figure 15:
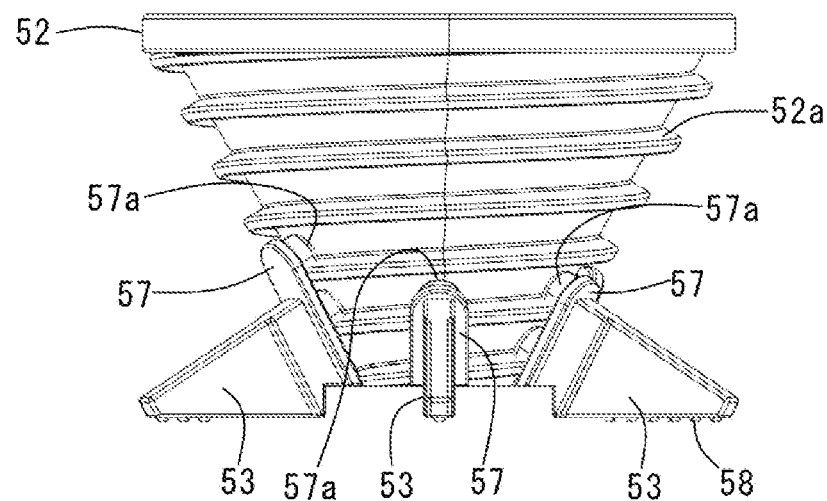
FIG. 15 A front view of a tablet supporting pedestal (a) and a bottom view (b) showing an arrangement condition of the tablet supporting pedestal.
Figure 15:
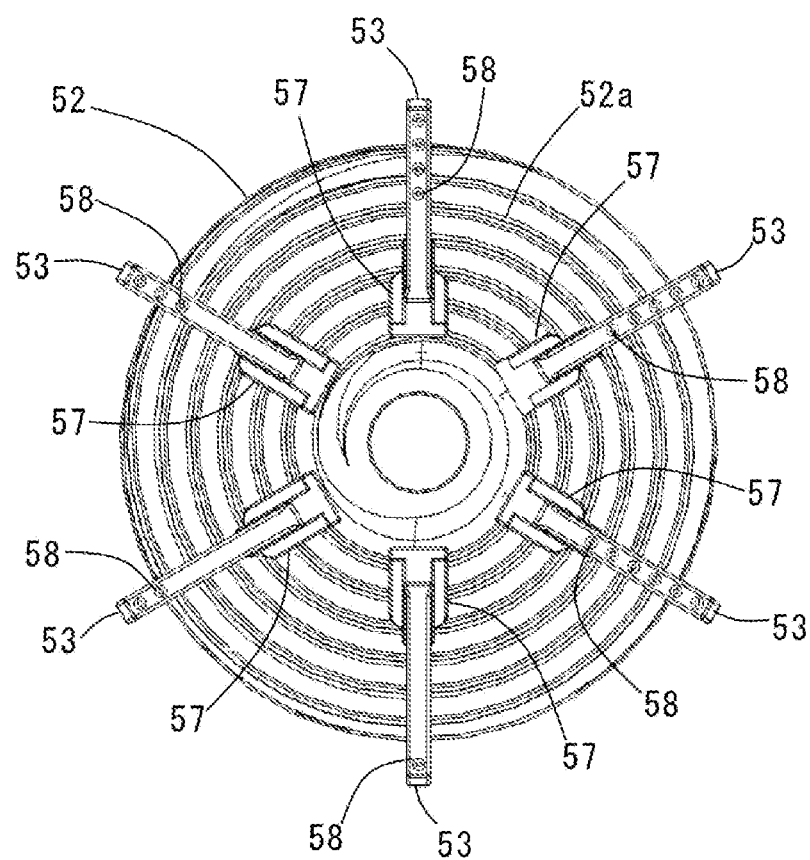

As shown in FIG. 15 (a), since the spiral guide 52a inclines with a lead angle, and when arranging the same six tablet supporting pedestals 53 circumferentially along the recess of the spiral guide 52a, the bottom lines 53a of the six tablet supporting pedestals 53 have different positions. Thus, for making the positions of the bottom lines 53a of six tablet supporting pedestals 53 to be equal, the size of each fixing base can be made larger and larger in turn, and the engagement protrusions 57a are disposed at the higher positions in turn. As described above, since the shapes of each of the tablet supporting pedestals 53 become different such that as shown in FIG. 15 (b) the bottom lines 53a are disposed with six convex marks each of which indicates an assembling order to the spiral guide 52a.

The height adjustment member 90 is attached, as shown in FIG. 12, to an engagement part 47a of a notch 47 formed to the operation base 41 of the operation part 40 and has at the lower end a driving gear 91 meshing with the driven gear 52b of rotation member 52. The top of the height adjustment member 90 protrudes and is exposed adjustably and externally from the hole 26 of the upper face of the base part 21 formed to the elevator member 20.

The rotation part 52 is received in the supporting member 51 under the condition where the six tablet supporting pedestals 53 are engaged. The opening of the supporting member 51 is covered with the operation base 41. The operation base 41 is fixed and is attached to the supporting member 51 by engaging the engagement piece 49 with the engagement concave part 51c of the supporting member 51, fitting the engagement hole 48a of the protrusion part 48 to the engagement protrusion part 54a of a supporting shaft 54 disposed to the supporting member 51, and screwing the fixing screw 59b to the screw hole 54b of the supporting shaft 54 disposed to the supporting member 51.

Figure 21:
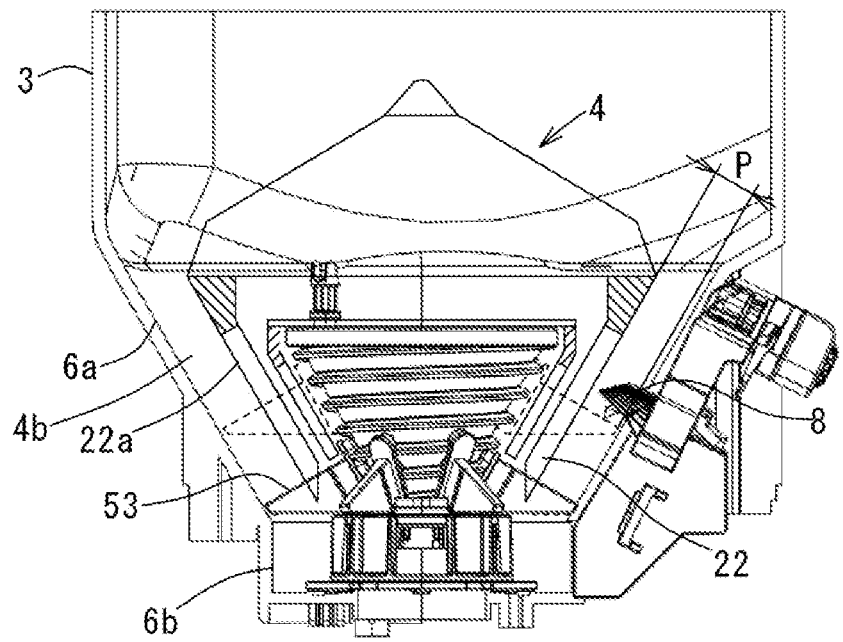
FIG. 21 A partial cross-sectional lateral view of a tablet cassette showing movement of a tablet supporting pedestal.

The fixing base 57 of the tablet supporting pedestal 53 is supported by guides 55a of the supporting member 51 from both sides, and the tablet supporting pedestal 53 is fitted slidably into the slit 55 of the supporting member 51. Thereby, the tablet supporting pedestal 53 can support the tablet at the bottom position in the tablet guiding path 4b. As shown in FIG. 21, when the tablet supporting pedestal 53 is placed at the lowest position, the position of a spiral guide 52a formed to the rotation member 52 is defined in the configuration where the top of the tablet supporting pedestal 53 is placed at the lower end of the upper slanted inner face 6a in the cassette body 3.

<Width Adjustment Mechanism>

Figure 16:
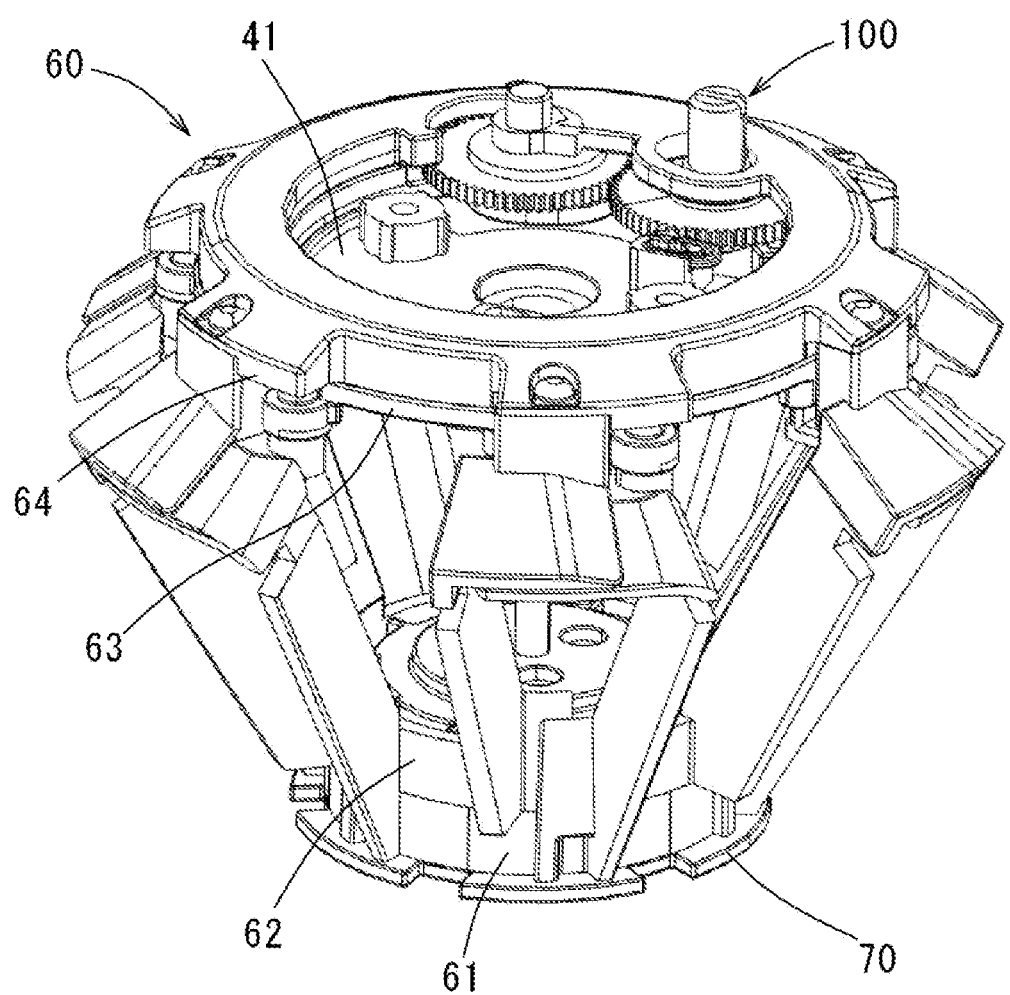
FIG. 16 A whole perspective view of a width adjustment mechanism.
Figure 17:
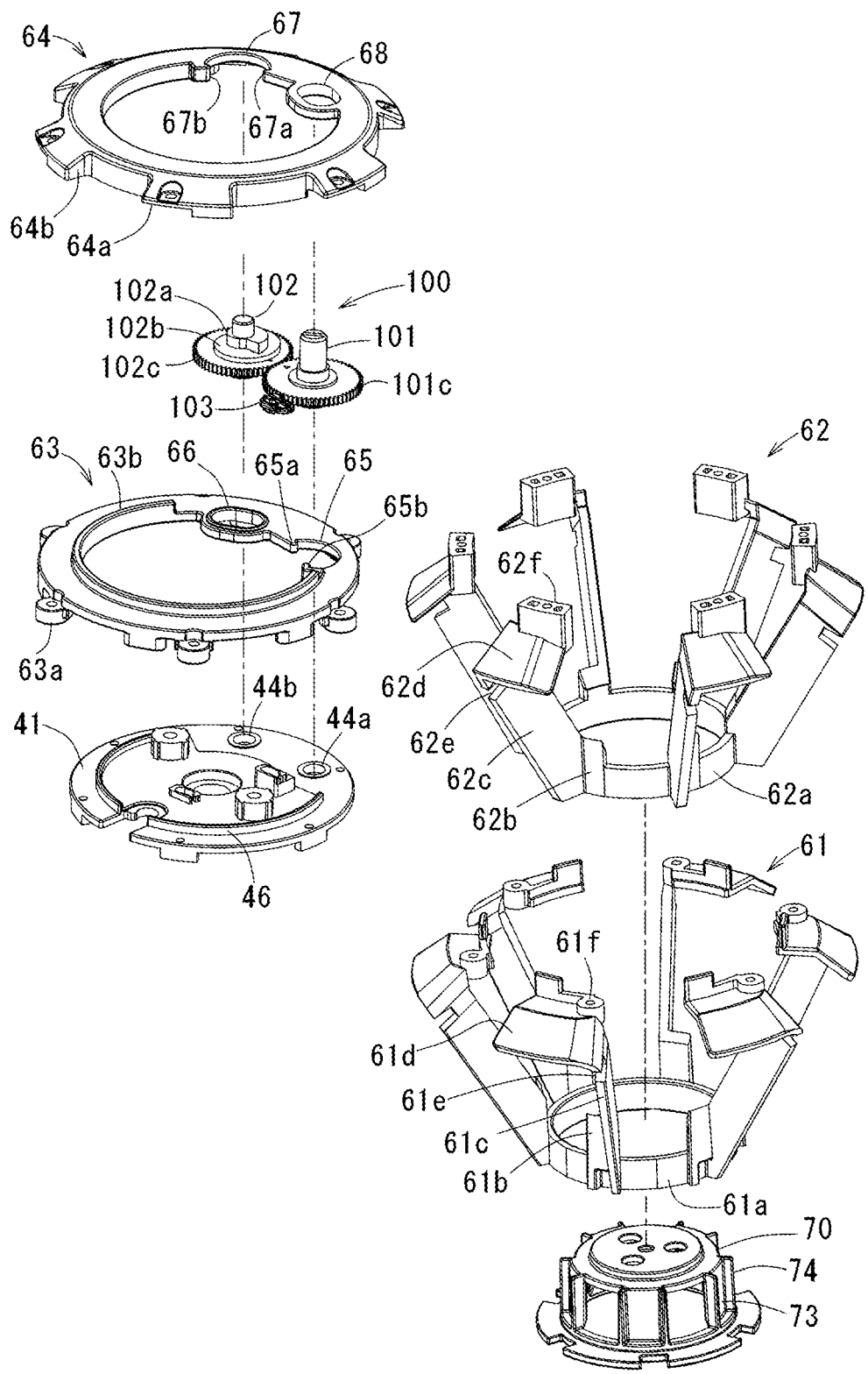
FIG. 17 A perspective view of configuration parts of the width adjustment mechanism.

FIG. 16 shows a whole view of the width adjustment mechanism, and FIG. 17 shows members configuring the width adjustment mechanism. The width adjustment mechanism includes a first movable member 61, a second movable member 62, a first supporting member 63, a second supporting member 64, and a width adjustment member 100.

The first movable member 61 includes an annular base part 61a, six wall parts 61b, a first vertical protrusion piece 61c, and a first horizontal protrusion piece 61d. The base part 61a fits rotatably to the leg part 73 having the libs 74 of the lower base 70. Six wall parts 61b protrude upward at the circumferential six evenly distributed positions of the outer circumferential edge of the base part 61a. The first vertical protrusion piece 61c protrudes radially outward from the left side end when viewed from the front of the wall parts 61a and forms a left side face of the set forth tablet guiding path 4b. To the first vertical protrusion piece 61c, the notch 61e to which the separating member 8 is fitted is formed. The first horizontal protrusion piece 61d extends horizontally circumferentially to the left side from the top end of the first vertical protrusion piece 61c when viewed from the front and forms the bottom face of the set forth tablet pocket 4a. At the inner edge of the first horizontal protrusion piece 61d, a fitting seat 61f is disposed.

The second movable member 62 includes an annular base part 62a, six wall parts 62b, a vertical protrusion part 62c, and a second horizontal protrusion part 62d. The base part 62a is rotatably fitted on the base part 61a of the first movable member 61 which is attached beforehand to the leg part 73 having the libs 74 of the lower base 70. Six wall parts 62b protrude upward at the circumferential six evenly distributed positions of the outer circumferential edge of the base part 62a. The second vertical protrusion piece 62c protrudes radially outward from the left side end when viewed from the front of the wall parts 62b and forms a right-side face of set forth tablet guiding path 4b. To the second vertical protrusion piece 62c, the notch 62e to which the separating member 8 is fitted is formed. The second horizontal protrusion piece 62d extends horizontally circumferentially to the right side from the top end of the second vertical protrusion piece 62c when viewed from the front and forms the bottom face of the set forth tablet pocket 4a. At the inner edge of the second horizontal protrusion piece 62d, a fitting seat 62f is disposed. The top part of the second horizontal protrusion piece 62d formed to the second movable member 62 is configured to overlap on the top part of the first horizontal protrusion piece 61d formed to the first movable member 61.

Figure 18:
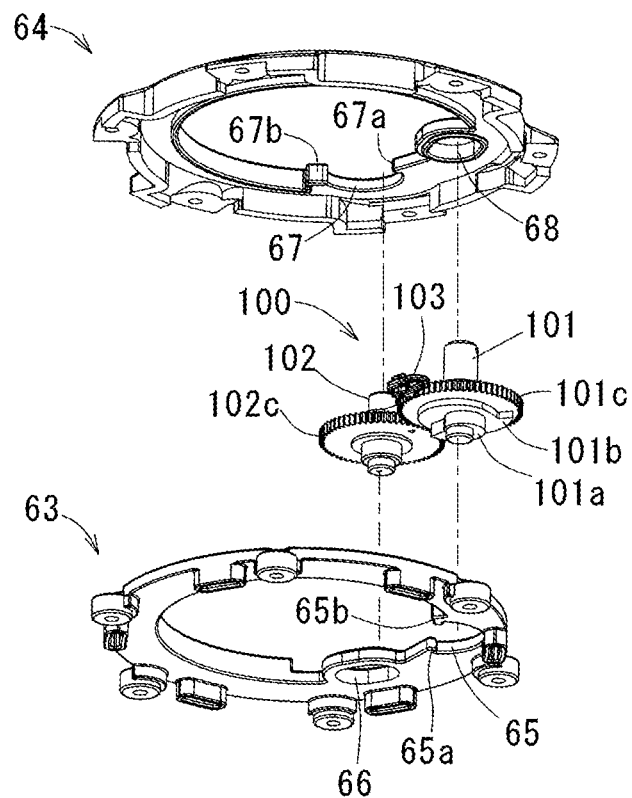
FIG. 18 A perspective view looked up from a bottom showing a width adjustment member, a first supporting member and a second supporting member.

The first supporting member 63 is, as shown in FIG. 17 and FIG. 18, disposed with a fitting seat 63a facing opposite to the fitting seat 61f of the first movable member 61 at its outer circumferential face and is screwed to the fitting seat 61f of the first movable member 61 by a fitting screw not shown. The inner periphery of the first supporting member 63 has the diameter with which the guide 46 of the operation base 41 formed to the operation part 40 engages. At the inner circumferential edge of the top face of the first supporting member 63, an arch shaped guide 63b is formed.

To the first supporting member 63, two of a near semi-circled notch 65 and a long hole 66 are adjacently formed on its inner circumference. At the edge of the notch 65 positioned at the downstream side in the clockwise direction when viewed the first supporting member 63 from the top, an A-protrusion 65a and a B-protrusion 65b positioned opposite in the circumferential direction are formed. The A-protrusion 65a and the B-protrusion 65b become a cam follower slidingly adjacent to an A-cam 101a and a B-cam 101b of the first adjustment shaft 101 described later.

The second supporting member 63 is, as shown in FIG. 17 and FIG. 18, disposed with a fitting seat 64a facing opposite to the fitting seat 62f of the first movable member 62 at its outer circumferential face and is screwed to the fitting seat 62f of the first movable member 62 by a fitting screw not shown. An inner periphery of the first supporting member 64 has the diameter with which the guide 63b of the first supporting member 63 engages. At the inner circumferential edge of the top face of the first supporting member 64, a notch 64b engaged with the downward protruding protrusion part 22 of the elevator member 20 is formed.

To the second supporting member 64, two of a near semi-circled notches 67 and a long hole 68 are adjacently formed on its inner circumference. At the edge of the notch 67 positioned at the upstream side in the clockwise direction when viewed the second supporting member 64 from the top, an A-protrusion 67a and a B-protrusion 67b positioned opposite in the circumferential direction are formed. The A-protrusion 67a and the B-protrusion 67b become a cam follower slidingly adjacent to an A-cam 102a and a B-cam 102b of the first adjustment shaft 102 described later.

The width adjustment member 100 includes, as shown in FIG. 17 and FIG. 18, a first adjustment shaft 101 and a second adjustment shaft 102. The first adjustment shaft 101 is disposed between the notch 65 and the long hole 68 which is overlapped each other. The second adjustment shaft 102 is disposed between the long hole 66 and the notch 67 which is overlapped each other. To the first adjustment shaft 101, a stopper 103 for preventing the first adjustment shaft from its free rotation is disposed.

The first adjustment shaft 101 is, as shown in FIG. 18, in turn from the lower end, formed with an A-cam 101a, a B-cam 101b, and a gear 101c. The A-cam 101a contacts slidingly to an A-protrusion 65a of the first movable member 61. The B-cam 101b contacts slidingly to a B-protrusion 65b of the first movable member 61. The upper end of the first adjustment shaft 101 passes through the hole 34b of the upper base 30 and is exposed into the hole of the elevator member 20 for allowing rotational and external adjustments. The lower end of the first adjustment shaft 101 is supported by the hole 44a of the operation base 41.

Similarly, the second adjustment shaft 102 is, as shown in FIG. 17, in turn from the upper end, formed with an A-cam 102a, a B-cam 102b, and a gear 102c. The A-cam 102a contacts slidingly to an A-protrusion 67a of the second movable member 62. The B-cam 102b contacts slidingly to a B-protrusion 67b of the second movable member 62. The gear 102c of the second adjustment shaft 102 meshes with the gear 101c of the first adjustment shaft 101 to be moved synchronously. The upper end of the second adjustment shaft 102 is supported by the hole 34*c* of the upper base 30 and the lower end is supported by the hole 44*b* of the operation base 41.

<Rotor Function>

Next, the functions of the rotor 4 in the tablet cassette 1 having the set forth configuration will be described.

Referring to FIG. 2, as already described, between the cassette body 3 and the rotor 4, there are the tablet pocket 4*a* extending circumferentially at the upper lateral part of the rotor 4 and the plurality of the tablet guiding paths 4*b* extending downward from the upper lateral part of the rotor 4.

The tablets T received in the tablet receiver part 5 of the cassette body 3, according to the rotations of rotor 4, enter into the tablet pocket 4*a* while being mixed by the steps 14 of the rotor cover 10 and enter into the tablet guiding path 4*b* from the tablet pocket 4*a*; when the tablet guiding path 4*b* reaches near to the tablet discharging hole 7, the separating member 8 fixed to the cassette body 3 is inserted between the tablet T at the bottom position and the tablet T positioned upper than it in the tablet guiding path 4*b*. The tablets T upper than the separating member 8 are prevented from dropping downward by the separating member 8. The tablet T at the bottom position positioned more downstream than the separating member 8 is placed on the tablet supporting pedestal 53, and since the tablet supporting pedestal 53 is inclined, it falls toward the tablet discharging hole 7 on the second hypotenuse 53*c* and is discharged from the tablet discharging hole 7. The tablet T discharged from the tablet discharging hole 7 is dispensed through the tablet discharge path 2*a* of the base 2. Thereby, every time when the tablet guiding path 4*b* is rotated to the tablet discharging hole 7, the tablet T is discharged one by one. By adjusting the rotation angle of the rotor 4, the tablets T in response to the prescription can be dispensed.

The tablet guiding path 4*b* can be adjusted, using the depth adjustment mechanism, the width adjustment mechanism, and width adjustment mechanism set forth, to the depth D corresponding to the thickness of tablet T, to the height H from the tablet supporting pedestal 53 to the separating member 8 corresponding to the height of tablet T, and to the width W corresponding to the width of tablet T. Thus, depending on shapes and sizes of the tablet T stored in the cassette body 3, the tablet guiding path 4*b* can be adjusted to appropriate sizes. Every time when the tablet T becomes different, without changing the whole tablet cassette 1 or the rotor 4 and with using the same tablet cassette 1 or the rotor 4, the discharge can be performed by adjusting the tablet guiding path 4*b* to various tablets T.

<Depth (Thickness) Adjustment of Tablet Guiding Path>

For adjusting the depth D of the tablet guiding path 4*b* corresponding to the thickness of the tablet T, in FIG. 4, the rotor cover 10 attached to the rotor 4 is removed and then the depth adjustment member 80 of the depth adjustment mechanism exposed on the upper face of the elevator member 20 is made to rotate to left or right.

Referring to FIG. 7, in the depth adjustment member 80, the gear part 82 is restricted in its movement to the shaft direction by the upper base 30 and the operation base 41, and the sliding part 28 of the elevator member 20 is engaged with the guiding part 36 of the upper base 30 to restrict the rotation of the elevator member 20 against the upper base 30 such that when the depth adjustment member 80 is made to rotate, the elevator member 20 having the screw hole 23*a*, which is screwed into the male screw part 81 of the depth adjustment member 80, goes up and down along the rotation shaft direction of the rotor 4. According to this, the slanted outer face 22*a* of the downward protruding part 22 formed to the elevator member 20 and forming the bottom face of tablet guiding path 4*b* also goes up and down.

Figure 20:
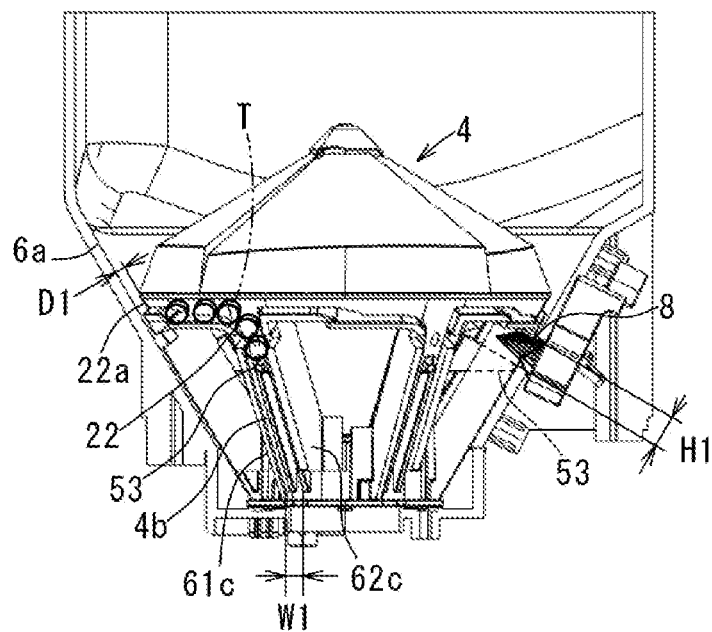
FIG. 20 A partial cross-sectioned lateral view of a tablet cassette of which depth, height and width of a tablet guiding path depending on a small tablet (a), and a partial cross-sectioned lateral view of a tablet cassette of which depth, height and width of a tablet guiding path depending on a large tablet (b).
Figure 20:
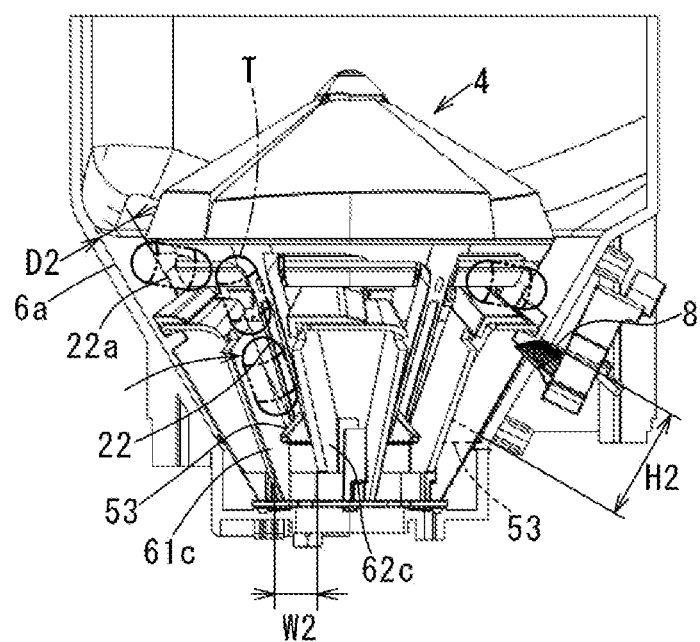

Referring to FIG. 20, the slanted outer face 22*a* of the downward protruding part 22 inclines radially from the outward direction to the inward direction as going downward and becomes parallel to the reverse-cone shaped upper slanted inner face 6*a* of the rotor receiver part 6 disposed to the cassette body 3. Thus, as shown in FIG. 20 (*a*), when the slanted outer face 22*a* of the downward protrusion part 22 formed to the elevator member 20 goes down, the distance between the slanted outer face 22*a* of the downward protruding part 22 and the reverse-cone shaped upper slanted inner face 6*a* of the cassette body 3 becomes small such that the depth of the tablet guiding path 4*b* may become shallow (D1). Contradictory to this, as shown in FIG. 20 (*b*), when the slanted outer face 22*a* of the downward protrusion part 22 formed to the elevator member 20 goes up, the distance between the slanted outer face 22*a* of the downward protruding part 22 and the reverse-cone shaped upper slanted inner face 6*a* of the cassette body 3 becomes large such that the depth of tablet guiding path 4*b* may become deep (D2). As described above, by rotating the depth adjustment member 80 to left or right, the depth of the tablet guiding path 4*b* can be adjusted depending on the thickness of the tablet T passing through the tablet guiding path 4*b*.

<Adjustment of Separation Position (Height) of Tablet Guiding Path>

For adjusting the separating position H of the tablet guiding path 4*b* corresponding to the height of tablet T, in FIG. 4, the height adjustment member 90 of the height adjusting mechanism exposed on the upper face of the elevator member 20 is made to rotate left or right. According to the present invention, the separating member 8 is fixed to the cassette body 3 and the tablet supporting pedestal 53 positioned below the separating member 8 is made to elevate rather than making the separating member 8 itself move for allowing to adjust the distance between the separating member 8 and the tablet supporting pedestal 53 as well as allowing to adjust the separation position H of the tablet T relatively.

Referring to FIG. 12, since the driving gear 91 of the height adjustment member 90 meshes with the driven gear 52*b* of the rotation member 52, the rotation of the height adjustment member 90 makes the rotation member 52 rotate about the supporting shaft 54 of the supporting member 51. The rotation member 52 is restricted in its up-and-down movement by the supporting member 51 and the operation base 41. The tablet supporting pedestal 53 having the engagement protrusion 54*a* engaging with the spiral guide 52*a* of the rotation member 52 is restricted in its rotation by the slit 55 of the supporting member 51 and the guides disposed at both sides. Thus, by the rotation of the rotation member 52 and according to the movement of spiral guide 52*a*, all the six tablet supporting pedestals 53 elevate in the same shift amount to the inclined direction of the rotation shaft of the rotor 4 along the tablet guiding path 4*b*.

That is to say, when the rotation member 52 rotates to one direction, as shown in FIG. 20 (*a*), the tablet supporting pedestal 53 is elevated and the position of the separating member 8 to the tablet supporting pedestal 53, i.e., the separation position becomes small (H1). Contradictory to this, when the separating member 52 rotates reversely, as shown in FIG. 20 (*b*), the tablet supporting pedestal 53 goes down and the position of the separating member 8 to the tablet supporting pedestal 53, i.e., the separation position becomes high (H2).

Figure 22:
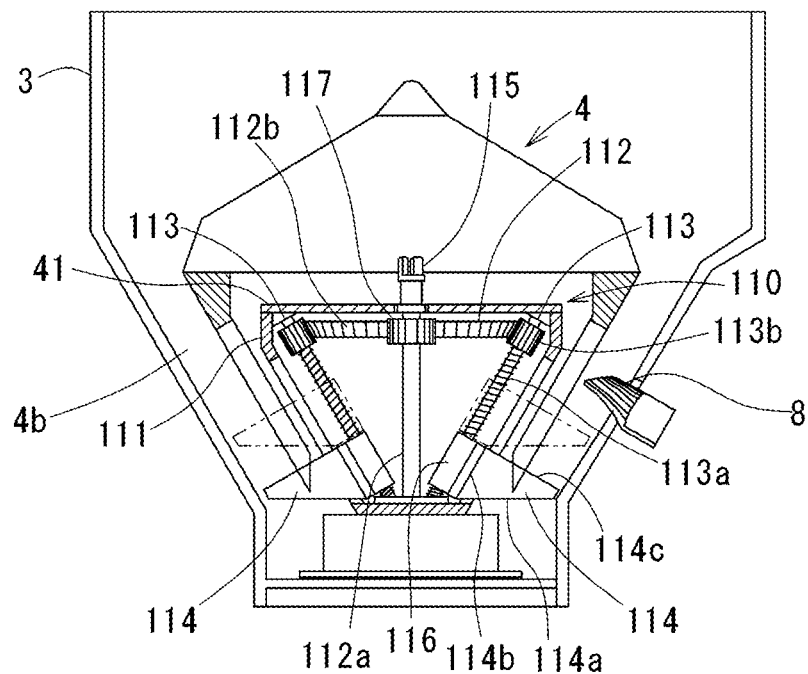
FIG. 22 A partial cross-sectional lateral view od a tablet cassette including a height adjustment mechanism of another embodiment.
Figure 23:
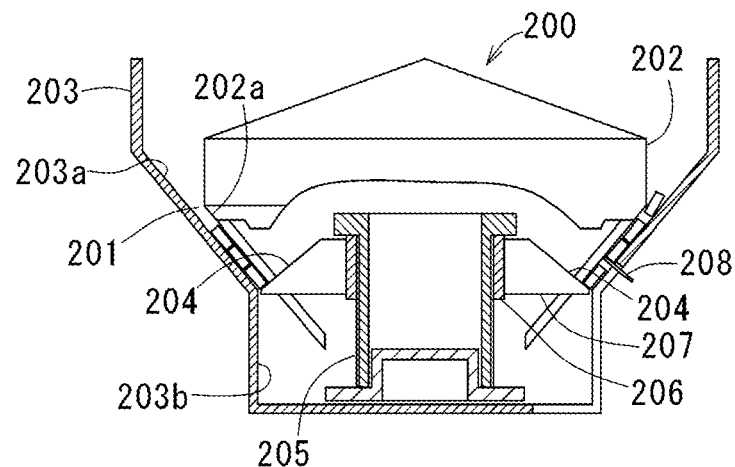
FIG. 23 A partial cross-sectional lateral view of a tablet cassette including a conventional height adjustment mechanism.
Figure 23:
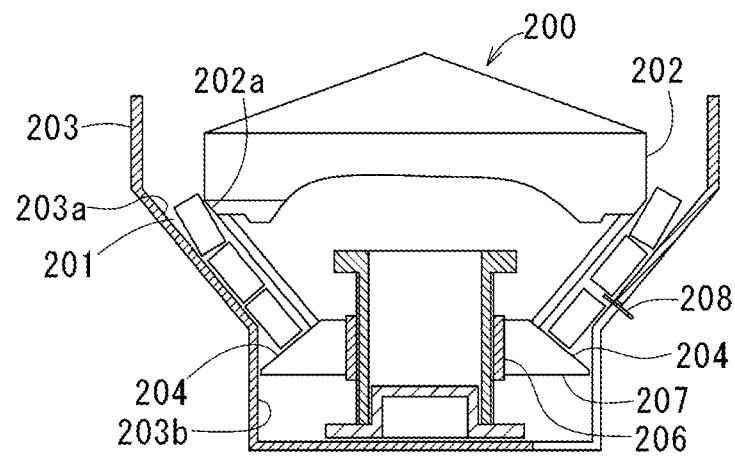
Figure 23:
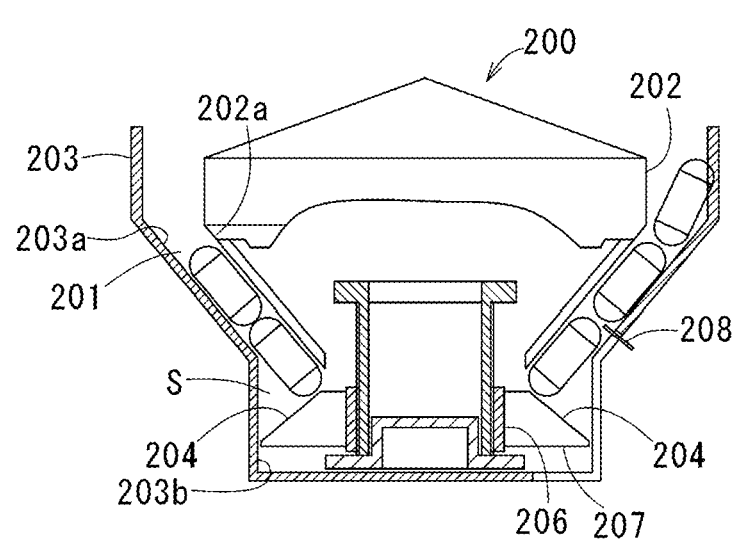

As shown in FIG. 22, when the tablet supporting pedestal 53 is at the lowest position, since the top of the tablet supporting pedestal 53 is located at the lower end of the upper slanted inner face 6a of the cassette body 3, though the tablet supporting pedestal 53 elevates in the direction inclined to the rotation shaft of the rotor 4 along the tablet guiding path 4b, the spacing between the tablet supporting pedestal 53 and the upper slanted inner face 6a of the cassette body 3 does not become increased. Thus, independent of the elevation position of tablet supporting pedestal 53, clogging of tablets in the tablet guiding path 4b can be prevented. In addition, the protrusion amount of the tablet supporting pedestal 53 that protrudes from the slanted outer face 22a through the slit 29 of the downward protrusion part 22 is constant independent of the elevation position of the tablet supporting pedestal 53. In this regard, the spacing between the tablet supporting pedestal 53 and the upper slanted inner face 6a of the cassette body 3 does not increase, and thus the tablet supporting pedestal 53 is lowered, there is no fear of clogging of tablet guiding path 4b by the tablets.

<Width Adjustment of Tablet Guiding Path>

For adjusting the width W of the tablet guiding path 4b corresponding to the width of the tablet T, in FIG. 4, the width adjustment member 100 exposed on the upper face of the elevator member 20 is made to rotate left or right.

Figure 19:
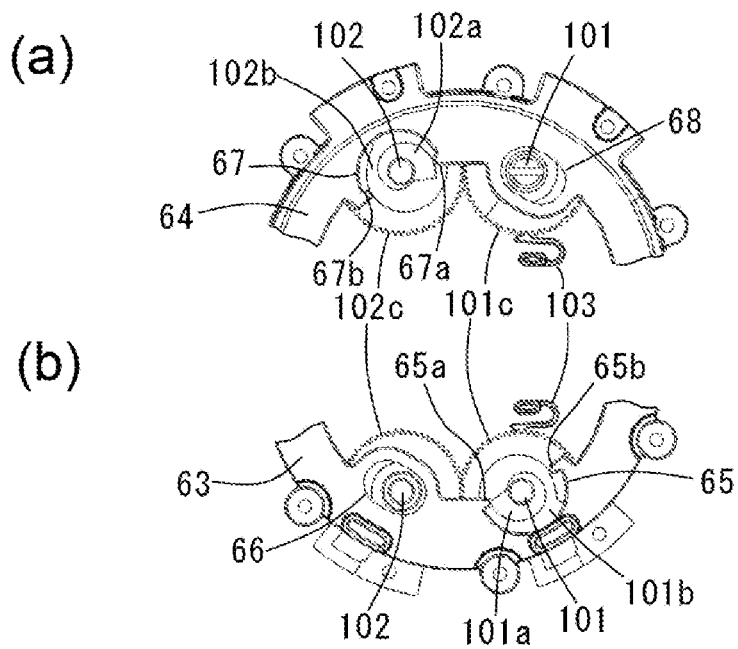
FIG. 19 A plane view (a) and a bottom view (b) showing movement of a width adjustment member.

When the first adjustment shaft 101 is made to rotate clockwise in FIG. 19 (a), the A-cam 101a of the first adjustment shaft 101 slidingly contacts to the A-protrusion 65a of the first supporting member 63, and thus the first supporting member 63 rotates counterclockwise together with the first movable member 61. In addition, by the clockwise rotation of the first adjustment shaft 101, the rotation force is transferred from the gear 101c of the first adjustment shaft 101 to the gear 102c of the second adjustment shaft 102 to make the second adjustment shaft 102 rotate counterclockwise. By the rotation of the second adjustment shaft 102, the A-cam 102a of the second adjustment shaft 102 slidingly contacts to and urges the A-protrusion 67a of the second supporting member 64 such that the second supporting member 64 is made to rotate clockwise together with the second movable member 62.

Subsequently, when the first adjustment shaft 101 is made to rotate counterclockwise in FIG. 19 (a), the B-cam of the first adjustment shaft 101 slidingly contacts to and urges the B-protrusion 65b of the first supporting member 63 such that the first supporting member 63 is made to rotate clockwise together with the first movable member 61. Furthermore, by the rotation of the first adjustment shaft 101, the rotation force is transferred from the gear 101c of the first adjustment shaft 101 to the gear 102c of the second adjustment shaft 102 to make the second adjustment shaft 102 rotate clockwise. By the clockwise rotation of the second adjustment shaft 102, the B-cam 102b of the second adjustment shaft 102 slidingly contacts to and urges the B-protrusion 67b of the second supporting member 64 such that the second supporting member 64 is made to rotate counterclockwise together with the second movable member 62.

As described above, since the first movable member 61 and the second movable member 62 rotate reversely each other, as shown in FIG. 20 (a), (b), the spacing between the first vertical protrusion piece 61c of the first movable member 61 and the second protrusion piece of the second movable member 62, i.e., the width of tablet guiding path 4b can be made to decrease (W1) and to increase (W2).

Other Embodiment

The height adjustment mechanism of the above embodiment is one that uses the spiral guide, however, not limited to the spiral guide, other mechanism may be used. Hereinbelow, other embodiments of the height adjustment mechanism will be described.

FIG. 22 shows a height adjustment mechanism according to the other embodiment. The height adjustment part 110 is configured from a supporting member 111, a first rotation member 112, six second rotation members 113, six tablet supporting pedestals 114, and a height adjustment member 111.

The supporting member 111 is the same with the supporting member 51 of the above embodiment, and hence, the same signs are attached and explanations will be omitted.

The first rotation member 112 has a circular plate shape. To a bottom face of the first rotation member 112, a cylindrical shaft part 112a is disposed. To an outer circumferential face of the first rotation member 112, a driven gear 112b is formed.

Six second rotation members 113 are supported rotatably with an inner face of supporting member 111. To an outer circumferential face of each second rotation shaft 113, a male screw 113a is formed. At the top end of the second rotation member 113, a pinion gear 113b mashing with the driven gear 112b of the first rotation member 112 is provided.

Each of six tablet supporting pedestals 114 includes a bottom line 114a, a first hypotenuse 114b, a second hypotenuse 114c and has a near right-angled triangle plate shape forming the right angle by the first hypotenuse 114b and the second hypotenuse 114c. To the first hypotenuse 114b, a fixing base 116 is disposed and the fixing base 116 is screwed into a male screw 113a of the second rotation member 113. The second hypotenuse 114c is positioned at the lower end of the tablet guiding path 4b and supports the tablet at the lowest position in the tablet guiding path 4b.

The height adjustment member 115 is fixed to an engagement part 47a of the notch 47 formed to the operation base 41 of the operation part 40 and has a driving gear 117 at the lower end meshing with a driven gear 112b of the first rotation member 112. The upper end of the height adjustment member 115, likely to the above embodiment, protrudes and is exposed from a hole 26a (refer to FIG. 7) of the upper face formed to the base part 21 of the elevator member 20 to allow external adjustment by the rotation.

When the height adjustment member 115 is rotated left and right, the driving gear 117 makes the first rotation member 112 rotate by meshing with the driven gear 112b of the first rotation member 112 and makes six second rotation members 113 rotate in the same direction, thereby the tablet supporting pedestal 53 screwed to the male screw 113a of the second rotation member 113 is elevated, and thus the distance between the separating member 8 and the tablet supporting member 53 can be adjusted.

The present invention is not limited to the above-described embodiments and may be changed variously within the scope of the invention described in CLAIMS.

For example, in FIG. 21, the slanted outer face 22a of the elevator member 20 formed to the rotor 4 and the upper slanted inner face 6a of the cassette body 3 is provided with the same slanted angle, and the height adjustment mechanism is elevated such that a protrusion amount P of the tablet supporting pedestal 53 from the slanted outer face 22a is kept constant independent of the elevation position. Particularly, according to the first embodiment, the inclination angle of the spiral guide 52a at the outer face of the rotation member 52 is made equal to the inclination angle of the slanted outer face 22a of the downward protrusion part 22; alternatively, in the second embodiment, the slanted angle of the second rotation member 113 is made equal to the inclination angle of the slanted outer face 22a of the downward protrusion part 22. Alternatively, in the first embodiment of FIG. 21, the tablet supporting pedestal 53 is configured elevatably to the shaft direction of the rotor 4, and a part of the tablet supporting pedestal 53 is made to expand or contract depending on the height of the tablet supporting pedestal 53 such that the protrusion amount P may become constant.

In the first embodiment, though the spiral guide 52a of the outer face formed to the rotation member 52 is a spiral screw shape, a spiral recess may be possible. Furthermore, in the second embodiment of FIG. 22, there is no first rotation member 112, and the second rotation member 113 may be independently moved to adjust the position of each tablet supporting pedestal 114.

EXPLANATION OF SIGNS AND NUMERALS

T tablet
1 tablet cassette
2 motor base
3 cassette body
4 rotor
4a tablet pocket
4b tablet guiding path
5 tablet storage part
6 rotor receiver part
6a upper slanted inner face
6b lower vertical inner face
7 tablet discharging hole
8 separating member
10 rotor cover
20 elevator member
22a slanted outer face
30 upper base
40 operation part
41 operation base
50 height adjustment part
51 supporting member
52 rotation member
52a spiral guide
52b driven gear
53 tablet supporting pedestal
55 slit
60 width adjustment part
70 lower base
80 depth adjustment part
90 height adjustment part
100 width adjustment part
110 height adjustment part
111 supporting member
112 first rotation member
112a shaft part
112b driven gear
113 second rotation member
113a male screw
113b pinion gear
114 tablet supporting pedestal
115 height adjustment member

The invention claimed is:

1. A rotor received rotatably in a cassette body for receiving tablets, the rotor comprising:
a tablet guiding path formed between a slanted inner face of the cassette body and a slanted outer face of the rotor for guiding the tablets received in the cassette body to a tablet discharging hole disposed to the cassette body;
a separating member disposed above the tablet discharging hole of the cassette body for separating a space between a tablet at a bottom position and a tablet at an upper position;
a tablet supporting pedestal disposed elevatably to the tablet guiding path for supporting the tablet at the bottom position in the tablet guiding path;
a height adjustment mechanism for adjusting a tablet discharging height between the tablet supporting pedestal and the separating member;
wherein the height adjustment mechanism makes the tablet supporting pedestal elevate to a direction inclined to a rotation shaft of the rotor along the tablet guiding path; and
wherein the height adjustment mechanism comprises a rotatable rotation member formed with a spiral guide at an outer circumferential face for engaging with the tablet supporting pedestal, a supporting member for preventing movement of the tablet supporting pedestal along the spiral guide by supporting the tablet supporting pedestal from both sides, and a height adjustment member for making the tablet supporting pedestal engaging with the spiral guide elevate to a direction inclined to a rotation shaft of the rotor.

2. The rotor of claim 1, wherein the rotation member includes a reversed cone-shaped outer circumferential face.

3. The rotor of claim 1, wherein the supporting member comprises a reversed cone-shape covering an outer side of the rotation member and is formed with a slit for allowing the tablet supporting pedestal to protrude and the slit extends along the tablet guiding path to support the tablet supporting pedestal from both sides.

4. The rotor of claim 1, wherein the height adjustment member comprises a driving gear meshing with a driven gear formed at an inner circumferential face of the rotation member and is externally operatable.

5. The rotor of claim 1, wherein the rotor comprises a lower base, an operation base, and an upper base, and the supporting member is fixed to the lower base, the operation base is fixed to the supporting base, and the upper base is fixed to the operation base.

6. The rotor of claim 1, wherein the height adjustment mechanism comprises a first rotation member, a plurality of second rotation members synchronously rotating with the first rotation member and being formed with a male screw to which the tablet supporting pedestal is screwed, a supporting member for preventing the tablet supporting pedestal from rotating about the second rotation member by supporting the tablet supporting pedestal from both sides, a height adjustment member for making the first rotation member rotate and making the second rotation member rotate through the first rotation member so as to make the tablet supporting pedestal elevate to a direction inclined to a rotation shaft of the rotor.

7. A rotor received rotatably in a cassette body for receiving tablets, the rotor comprising:
a tablet guiding path formed between a slanted inner face of the cassette body and a slanted outer face of the rotor for guiding the tablets received in the cassette body to a tablet discharging hole disposed to the cassette body;

a separating member disposed above the tablet discharging hole of the cassette body for separating a space between a tablet at a bottom position and a tablet at an upper position;

a tablet supporting pedestal disposed elevatably to the tablet guiding path for supporting the tablet at the bottom position in the tablet guiding path;

a height adjustment mechanism for adjusting a tablet discharging height between the tablet supporting pedestal and the separating member;

wherein the height adjustment mechanism makes the tablet supporting pedestal elevate with keeping a protrusion amount from the slanted outer face constant independent of an elevation position of the tablet supporting pedestal; and wherein the height adjustment mechanism comprises a rotatable rotation member formed with a spiral guide at an outer circumferential face for engaging with the tablet supporting pedestal, a supporting member for preventing movement of the tablet supporting pedestal along the spiral guide by supporting the tablet supporting pedestal from both sides, and a height adjustment member for making the tablet supporting pedestal engaging with the spiral guide elevate to a direction inclined to a rotation shaft of the rotor.

8. A tablet cassette receiving the rotor of claim 1.

* * * * *